(12) United States Patent
Fukuda

(10) Patent No.: US 6,989,832 B2
(45) Date of Patent: Jan. 24, 2006

(54) ENTERTAINMENT APPARATUS, STORAGE MEDIUM AND OBJECT DISPLAY METHOD

(75) Inventor: Izumi Fukuda, Oomura (JP)

(73) Assignee: Sony Computer Entertainment Inc., Tokyo (JP)

( * ) Notice: Subject to any disclaimer, the term of this patent is extended or adjusted under 35 U.S.C. 154(b) by 705 days.

(21) Appl. No.: 09/766,132

(22) Filed: Jan. 19, 2001

(65) Prior Publication Data

US 2001/0035906 A1 Nov. 1, 2001

(30) Foreign Application Priority Data

Jan. 21, 2000 (JP) .................................. 2000-012810

(51) Int. Cl.
*G06T 15/00* (2006.01)

(52) U.S. Cl. .................................. 345/427; 463/32
(58) Field of Classification Search ................ 345/418, 345/427, 428, 619; 463/30, 31, 32; 707/10
See application file for complete search history.

(56) References Cited

U.S. PATENT DOCUMENTS

| | | | |
|---|---|---|---|
| 5,812,142 A | 9/1998 | Small et al. ................ 345/438 |
| 5,820,462 A | 10/1998 | Yokoi et al. .................. 463/37 |
| 5,850,352 A | 12/1998 | Moezzi et al. .............. 345/419 |
| 5,883,690 A | 3/1999 | Meyers et al. .............. 345/161 |
| 5,914,720 A | 6/1999 | Maples et al. .............. 345/419 |
| 6,001,014 A | 12/1999 | Ogata et al. .................. 463/37 |
| 6,040,841 A | 3/2000 | Cohen et al. ................ 345/473 |
| 6,072,504 A | 6/2000 | Segen ........................ 345/474 |
| 6,097,394 A | 8/2000 | Levoy et al. ................ 345/419 |
| 6,231,444 B1 | 5/2001 | Goto et al. .................... 463/37 |
| 6,241,611 B1 | 6/2001 | Takeda et al. ................ 463/38 |
| 6,325,717 B1 | 12/2001 | Kawagoe et al. ............. 463/33 |
| 6,330,356 B1 | 12/2001 | Sundareswaran et al. ... 382/154 |
| 6,332,840 B1 | 12/2001 | Nishiumi et al. ............. 463/38 |
| 6,342,009 B1 | 1/2002 | Soma .......................... 463/38 |
| 6,402,616 B1 | 6/2002 | Ogata et al. .................. 463/37 |
| 6,409,601 B2 | 6/2002 | Ogata et al. .................. 463/37 |
| 6,421,056 B1 | 7/2002 | Nishiumi et al. ............ 345/474 |
| 6,425,826 B1 | 7/2002 | Nakanishi et al. ............ 463/31 |
| 6,654,014 B2 * | 11/2003 | Endo et al. ................. 345/427 |
| 2001/0020934 A1 | 9/2001 | Fukuda ....................... 345/156 |
| 2001/0040996 A1 | 11/2001 | Ochi et al. .................. 382/154 |
| 2002/0021298 A1 | 2/2002 | Fukuda ....................... 345/427 |
| 2002/0068628 A1 | 6/2002 | Takatsuka et al. ............ 463/37 |

FOREIGN PATENT DOCUMENTS

| | | |
|---|---|---|
| EP | 0782104 A1 | 7/1997 |
| EP | 0 790 583 A1 | 8/1997 |
| EP | 0 859 338 A2 | 8/1998 |
| JP | 5-32237 | 4/1993 |

(Continued)

OTHER PUBLICATIONS

NINTENDO, "Instruction Booklet", Star Fox 64, Jul. 1, 1997, pp. 1–5, XP–002267695, http://www.world–of–nintendo.com/manuals/nintendo_64/star_fox_64.shtml>.

(Continued)

*Primary Examiner*—Phu K. Nguyen
(74) *Attorney, Agent, or Firm*—Fitch Even Tabin & Flannery

(57) ABSTRACT

In the case of displaying a moving picture obtained by photographing an object moving in a virtual three dimensional field by the use of a virtual camera, behavior of the object is made to be grasped more easily from the moving picture displayed on a display screen of a display device. A camera setup point 606, which is a setup point of the virtual camera 609, is settled so that the camera setup point 606 approaches a camera chasing point 604 settled to the rear of a position 602 on a line which passes through the position 602 of the object 601 and parallel with a moving direction of the object, from a camera setup point 606' obtained at least in the last calculation.

6 Claims, 16 Drawing Sheets

FOREIGN PATENT DOCUMENTS

| | | |
|---|---|---|
| JP | 6-190152 | 7/1994 |
| JP | 11-047449 A | 2/1999 |
| JP | 11-086031 | 3/1999 |
| JP | 11-146978 | 6/1999 |
| JP | 11-342265 | 12/1999 |
| WO | WO 98/06068 | 2/1998 |
| WO | WO 97/36261 | 3/1999 |

OTHER PUBLICATIONS

NINTENDO, "Star Fox 64", Game Legacy, retrieved from internet Jan. 21, 2004, Jun. 1, 1997, 1 page, XP-002267697, http://www.nintendo.com/gamesini?gameid=m-Game-0000-242>.

European Patent Office, "European Search Report" dated Feb. 27, 2004, for Application No. 01101286.1, 3 pages.

Japanese Patent Office, "Notification of Reason to Refusal" Sep. 10, 2002, pp. 1–4, English translation.

European Patent Office, "Partial European Search Report", cited in corresponding European Patent Application No. EP 01101285.3–1241, dated Oct. 15, 2004, 4 pages.

European Patent Office, "European Search Report", cited in corresponding European Patent Application No. EP 01101284.6, dated Feb. 9, 2005, 5 pages.

* cited by examiner

FIG.8
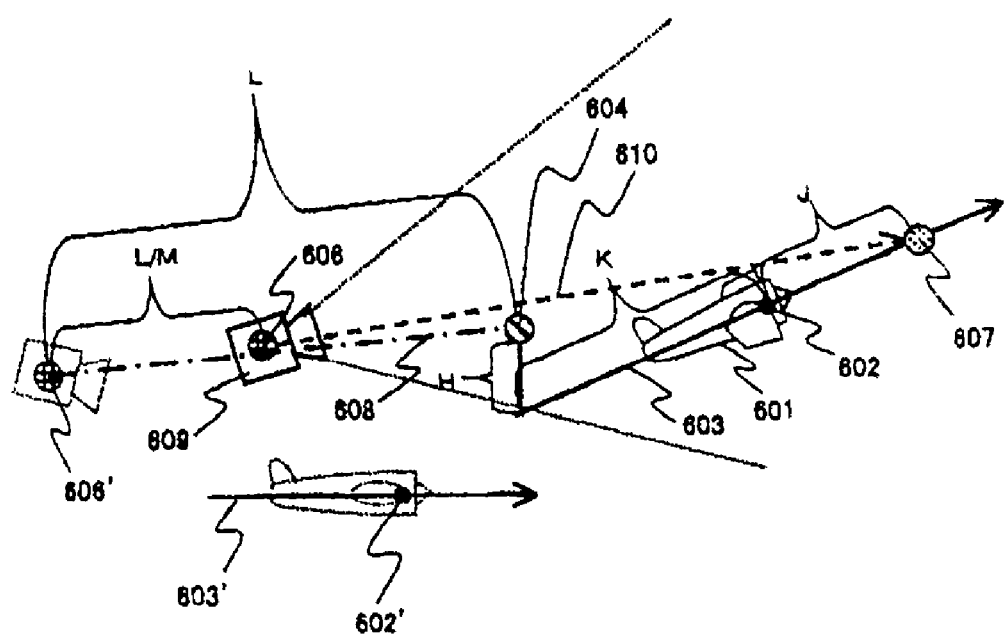
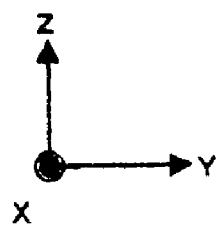

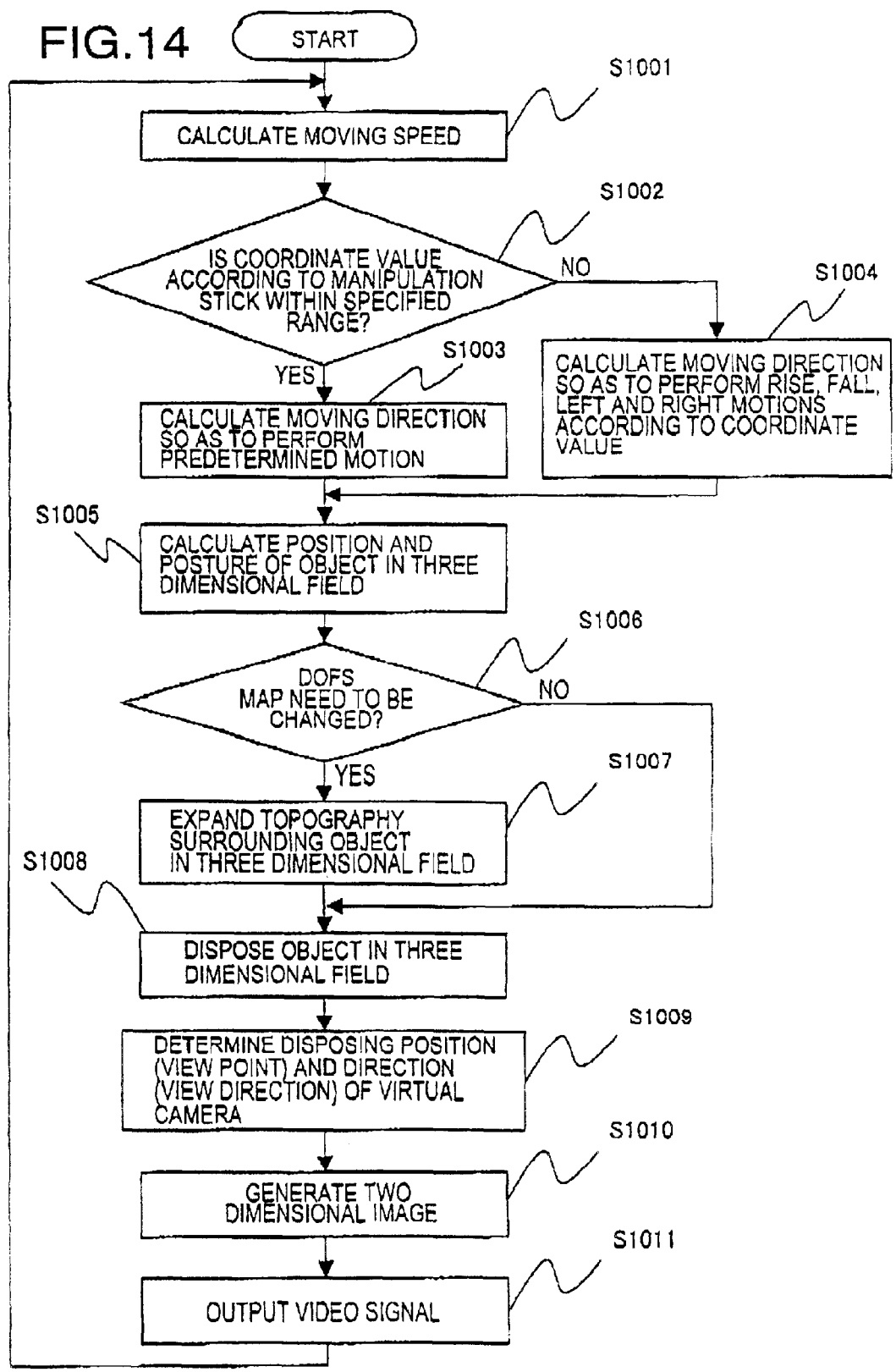

MOVING DIRECTION OF OBJECT

ENTERTAINMENT APPARATUS, STORAGE MEDIUM AND OBJECT DISPLAY METHOD

This application claims a priority based on Japanese Patent Application No. 2000-12810 filed on Jan. 21, 2000, the entire contents of which are incorporated herein by reference for all purposes.

BACKGROUND OF THE INVENTION

The present invention relates to a technology for forming a moving picture obtained by photographing an object with a virtual camera, and displaying the moving picture on a display screen of a display device. The object moves in a virtual three dimensional field in accordance with manipulation contents conducted by a user, the manipulation contents being accepted via a controller.

Entertainment apparatuses such as a TV game machine, which is capable of performing a flight simulation and a drive simulation by the use of a three dimensional graphic animation, have been recently spread.

In this kind of entertainment apparatuses, a player controls an object representing an airplane, an automobile and the like by the use of a controller connected to the entertainment apparatus, and can allow the object to move in a virtual three dimensional field. This entertainment apparatus generates a moving picture obtained by photographing the object moving in this three dimensional field by the use of a virtual camera, and displays the moving picture on a display screen of a display device connected thereto.

Incidentally, in the conventional entertainment apparatus capable of performing the flight simulation and the drive simulation, the virtual camera is set at a position determined uniquely (fixedly) depending on a positional relation between the camera and the object.

FIGS. 15A and 15B are drawings for explaining a positional relation between an object (an object representing an airplane) 901 and a virtual camera 902 in this kind of conventional entertainment apparatus. Hereupon, FIG. 15A shows a state where the object 901 and the virtual camera 902, which are disposed in a three dimensional field, are overlooked just from above, that is, from an infinitely long distance of the Z-axis, and FIG. 15B shows a state where the object 901 and the virtual camera 902, which are disposed in the three dimensional field, are viewed just from the side, that is from an infinitely long distance of the X-axis. Note that illustrations of map constituent elements disposed in the three dimensional field are omitted in these drawings.

As illustrated in FIGS. 15A and 15B, in the conventional entertainment apparatus capable of performing the flight simulation and the drive simulation, the virtual camera 902 is set at a camera setup point A, that is, a position higher by a predetermined distance H than a position to the rear of the object 901 by a predetermined distance L. The camera setup point A is disposed above a line 903 passing through the object 901 along the moving direction of the object 901. Alternatively, the virtual camera 902 is set at a camera setup point B, that is, a position of the object 901. A sight line of the virtual camera 902 is settled so as to be pointed at an arbitrary point on the line 903 further in front of the object 901.

FIGS. 16A and 16B are schematic views showing a pictorial image obtained by photographing the object 901 by the use of the virtual camera 902, which is disposed as illustrated in FIGS. 15A and 15B. Here, FIG. 16A shows an example of the pictorial image obtained by the virtual camera 902 when the virtual camera 902 is set at the camera setup point A in FIGS. 15A and 15B, and FIG. 16B shows an example of the pictorial image obtained by the virtual camera 902 when this camera 902 is set at the cameral setup point B in FIGS. 15A and 15B.

SUMMARY OF THE INVENTION

In the conventional entertainment apparatus capable of performing the flight simulation, the drive simulation and the like as described above, the virtual camera is set at the position determined uniquely (fixedly) depending on the relative position between the virtual camera and an object. Accordingly, the conventional entertainment apparatus has caused the following problems.

Specifically, a display position and a posture of the object on a display screen are constant irrespective of a flight/driving state (straight, turn or the like) of the object, and the flight/driving state appears as a movement of topography displayed around the object. Therefore, the conventional entertainment apparatus cannot reflect manipulation contents of a player received via the controller on the display position and a posture of the object displayed on the display screen, and hence the player cannot enjoy controlling the object satisfactorily.

Accordingly, in an entertainment apparatus displaying a moving picture on a display screen of a display device, the moving picture being obtained by photographing an object, which moves in a virtual three dimensional field, by the use of a virtual camera, the objective of the present invention is to make it possible for a player to grasp a behavior of the object in the three dimensional field more easily from the moving picture displayed on the display screen of the display device.

In an entertainment apparatus in which a player can control the object moving in the virtual three dimensional field by the use of a controller for a flight simulation, a drive simulation and the like, another objective of the present invention is to make it possible for the player to enjoy controlling the object satisfactorily. Specifically, the present invention is to make it possible for the manipulation contents, which the player entered to the object, to be reflected on the object on the display screen.

To achieve the foregoing objectives, in the entertainment apparatus of the present invention, which forms a moving picture obtained by photographing an object (objects representing, for example, an airplane and an automobile) moving in a virtual three dimensional field by the use of a virtual camera, and displays the moving picture on a display screen of a display device, a position and a moving direction of the object in the three dimensional field are sequentially calculated. Then, every time the position and the moving direction of the object are calculated, a setup point of the virtual camera in the three dimensional field is determined in consideration of a setup point of the virtual camera obtained at least in the last calculation.

For example, a camera chasing point is settled at a position higher by a predetermined value H than a position, which is located to the rear of the position of the object by a distance K, the position being on a line which passes through a newly calculated position of the object and is parallel with a newly calculated moving direction of the object. Then, a setup point of the virtual camera is settled at a position approaching the camera chasing point from the virtual camera setup point obtained at least in the last calculation. This setup point of the virtual camera is settled, for example, at a position approaching the camera chasing point from the setup point of the virtual camera obtained at least in the last calculation by a distance L/M, which is obtained by dividing a distance L between the camera chasing point and the setup point of the virtual camera obtained at least in the last calculation by a predetermined value M.

With such constitution, since previous setup points of the virtual camera are taken into consideration in determining the setup point of the virtual camera, the virtual camera behaves so as to chase after the object a little later than the motion of the object. For this reason, grasping the behavior of the object in the virtual three dimensional field through the display screen becomes easy. Therefore, in the case where a player controls the object by using the controller connected to the entertainment apparatus of the present invention, the player easily grasps the behavior of the object controlled by himself/herself in the virtual three dimensional field through the display screen. In addition, the feeling of being is increased and entertainingness is improved.

In the above-described example, the distance K may be set so as to be shorter as a moving speed of the object is increased. If the distance K is set to be shorter, the feeling of being is increased and the entertainingness is improved. However, in this case, though the camera chasing point is closer to the object as the moving speed of the object is increased, the distance K should preferably set so that the camera setup point leaves the object as the moving speed of the object is more increased. In other words, the distance K should be set so that the camera setup point moves further behind relative to the moving direction of the object as the moving speed of the object is more increased.

In the actual world, when someone drives an automobile or pilots an airplane, he or she must pay attention generally to the broader and farther surroundings with an increase of a moving speed. By setting the distance K as described above, similarly to the actual world, when the player increases the moving speed of the object by using the controller, a pictorial image surrounding the object taken (that is, the pictorial image displayed on the display screen of the display device) by the virtual camera becomes wider depending on an increase amount of the moving speed. Therefore, operability when the moving speed of the object is increased is improved.

Moreover, in the present invention, a camera reference point is settled at a position, which is located in front of the position of the object by a distance J, the position being on a line which passes through a newly calculated position of the object, and is parallel with a newly calculated moving direction of the object. Then, a sight line direction may be set so that the virtual camera is pointed at the camera reference point. In addition, the distance J may be set so that the distance J is longer as the moving speed of the object in the three dimensional field is increased.

With such constitution of the entertainment apparatus of the present invention, when the player increases the moving speed of the object by using the controller, a pictorial image surrounding the object taken by the virtual camera, that is, the pictorial image displayed on the display screen of the display device, expands farther depending on the increase amount of the moving speed. Therefore, operability when the moving speed of the object is increased is improved.

Still further, in the present invention, the virtual camera may be rotated around the sight line direction as an axis depending on the rotation of the object around the moving direction thereof as an axis. With such rotation of the camera, the feeling of being is increased and entertainingness is improved.

BRIEF DESCRIPTION OF THE DRAWINGS

FIG. 8 is an explanatory view for explaining a positional relation between the controlled object 601 and the virtual camera 609 disposed in the three dimensional field by the camera disposing section 805 shown in FIG. 6.

FIG. 14 is a flowchart for explaining an operation of the software structure to realize a flight simulation constructed on the entertainment apparatus 1 of FIG. 6.

DETAILED DESCRIPTION OF THE PREFERRED EMBODIMENTS

An embodiment of the present invention will be hereinafter described.

A hardware structure of an entertainment apparatus according to an embodiment of the present invention will be described.

An appearance of the entertainment apparatus according to the embodiment of the present invention will be described in FIG. 1.

This entertainment apparatus reads out a game program stored in an optical disc and the like such as CD-ROMs and DVD-ROMs, and executes a game in response to an instruction from a player. An execution of the game mainly means that a controlled object such as an object representing, for example, an airplane and an automobile, which is being displayed on a display screen of a display device such as a TV connected to the entertainment apparatus, is allowed to move, and a display of a moving picture and sound are controlled in accordance with a motion of the object in response to an instruction from a player, thus proceeding the game.

Figure 1:
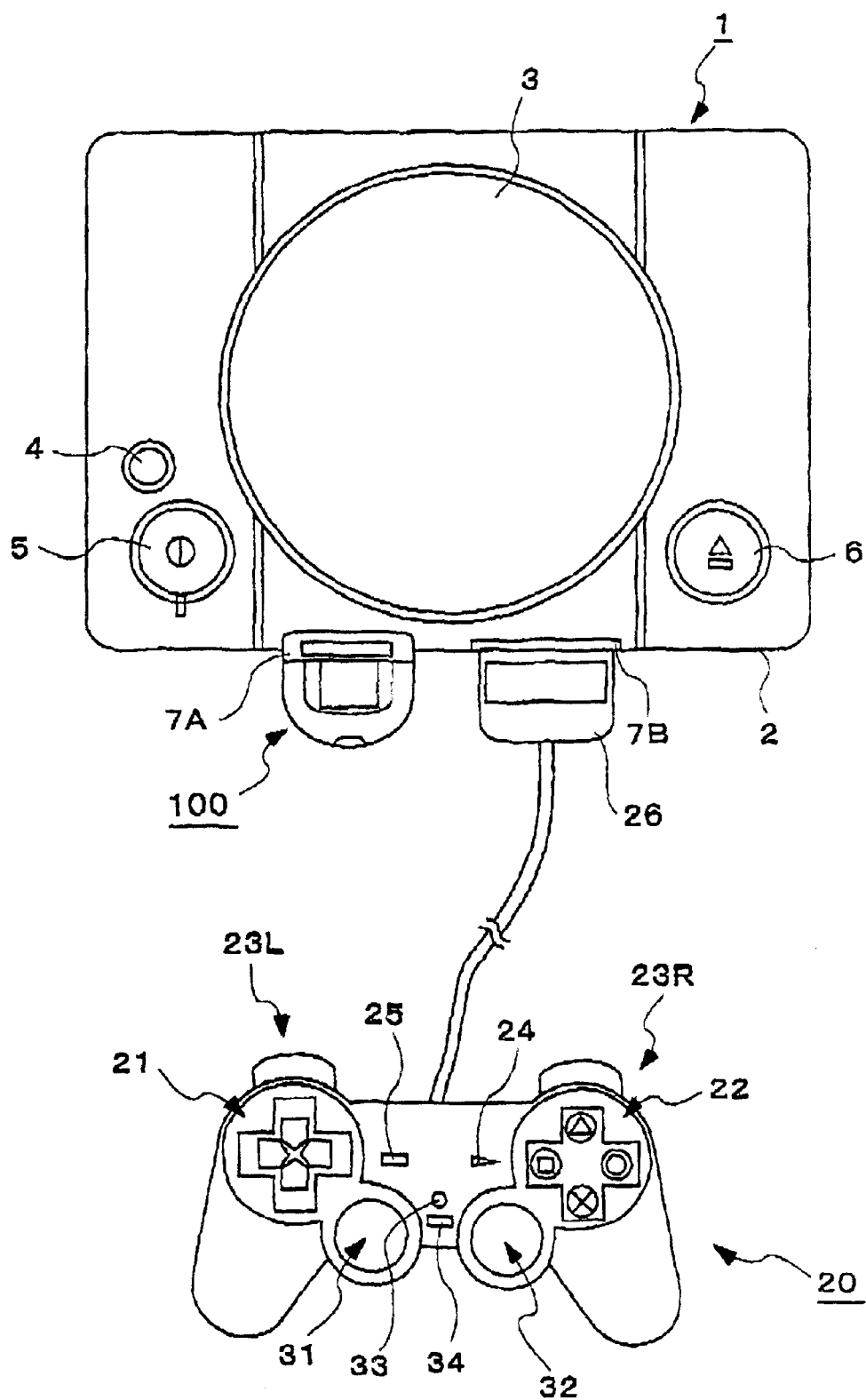
FIG. 1 exemplifies an apparatus of an entertainment apparatus 1 and a controller 20 to which an embodiment of the present invention is applied.

As illustrated in FIG. 1, a main body 2 of the entertainment apparatus 1 comprises: a disc inserting potion 3, in the center of which an optical disc such as a CD-ROM and a CVD-ROM is inserted that are a recording medium for supplying an application program of a TV game and the like and multimedia data; a reset switch 4 for resetting the game; a power switch 5; a disc manipulation switch 6 for manipulating an insertion of the optical disc; and, for example, two slot portions 7A and 7B.

Two controllers 20 can be connected to the slot portions 7A and 7B, and two players can perform a match game, a competition game and the like. The slot portions 7A and 7B can be equipped with a memory card device 26 that can store and read out game data, and a portable electronic appliance 100 that can execute the game in a state where it is detached from the main body 2.

The controller 20 has first and second manipulation portions 21 and 22, an L button 23L, an R button 23R, a start button 24 and a selection button 25. A controller 20 further has analog manipulation portions 31 and 32, a mode selection switch 33 for selecting a manipulation mode of the manipulation portions 31 and 32, and a display portion 34 for displaying the selected manipulation mode.

Figure 2:
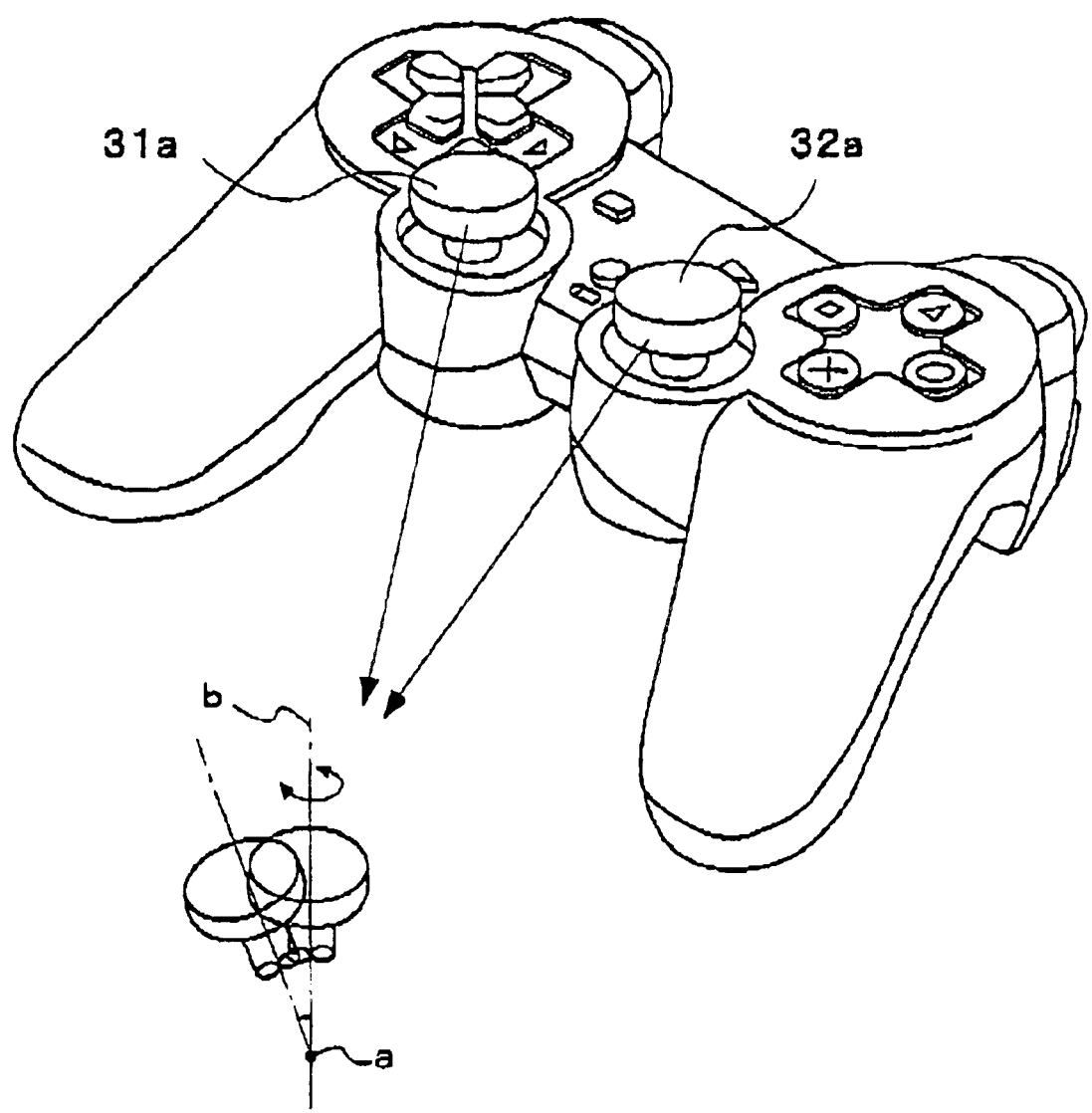
FIG. 2 is a perspective view showing the controller 20 in FIG. 1.
Figure 3:
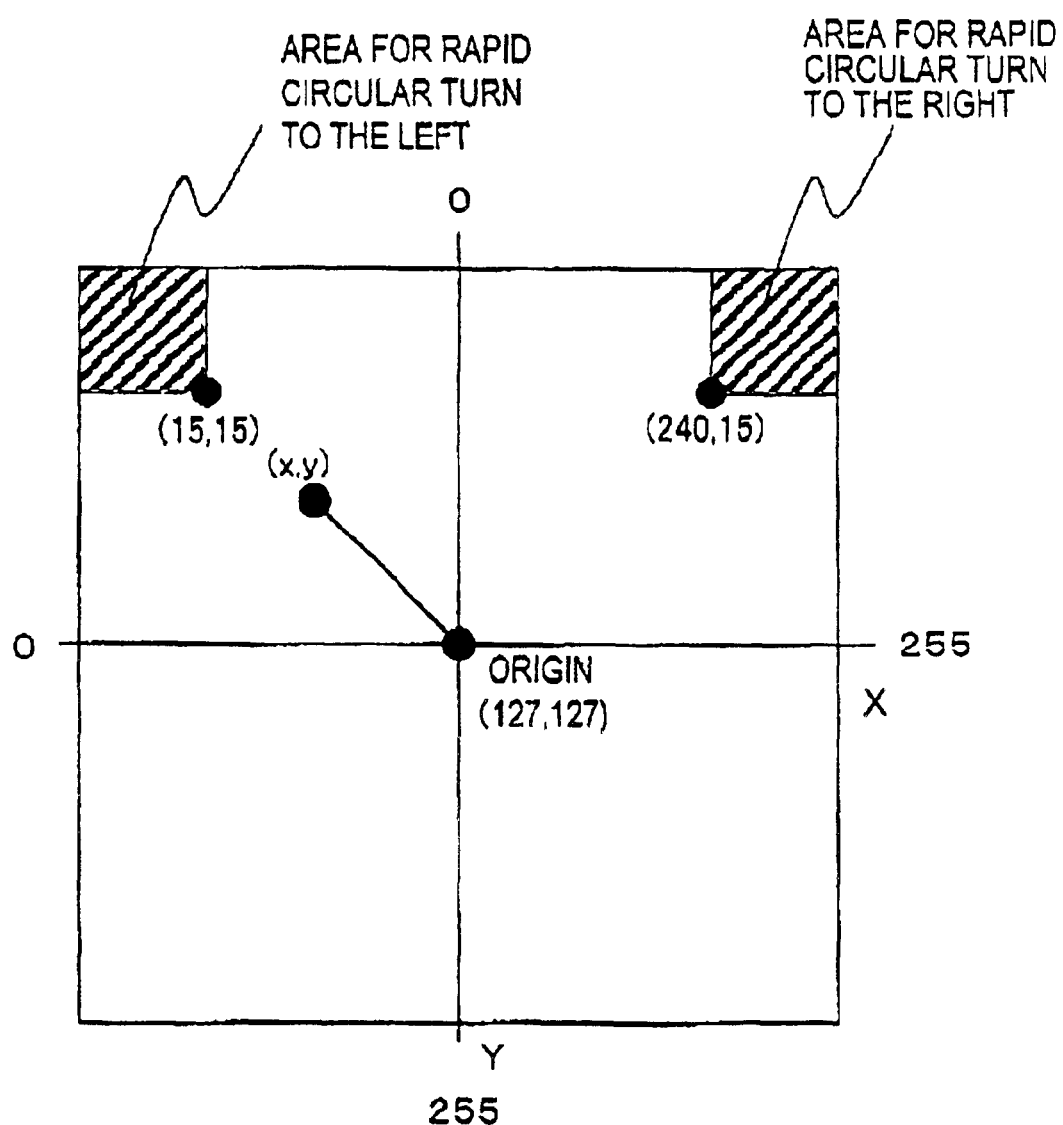
FIG. 3 is a diagram for explaining values that can be entered into the entertainment apparatus 1 by the use of manipulation sticks 31a and 31b of the controller 20 shown in FIG. 2.

The respective manipulation portions 31 and 32 have manipulation sticks 31a and 32a, each of which is constituted so as to be pivotally tilted and to be rotatable in the tilted state using a specified fulcrum "a" relative to a specified axis "b" passing through the fulcrum "a", as shown in FIG. 2. The controller 20 detects a tilt of each of the manipulation sticks 31a and 32a relative to the axis "b" and a tilt direction thereof, and then outputs a signal in accordance with coordinate values on the X-Y coordinate decided based on the tilt and the tilt direction. As shown in FIG. 3, the coordinate value in the Y-direction (vertical) is represented by one of 256 stages ranging from "0" to "255" depending on the tilts of the manipulation sticks 31a and 32a in the upward and downward direction, and the coordinate value in the X-direction (horizontal) is represented by one of 256 stages ranging from "0" to "255" depending on the tilts of the manipulation sticks 31a and 32a in the right and left direction.

Figure 4:
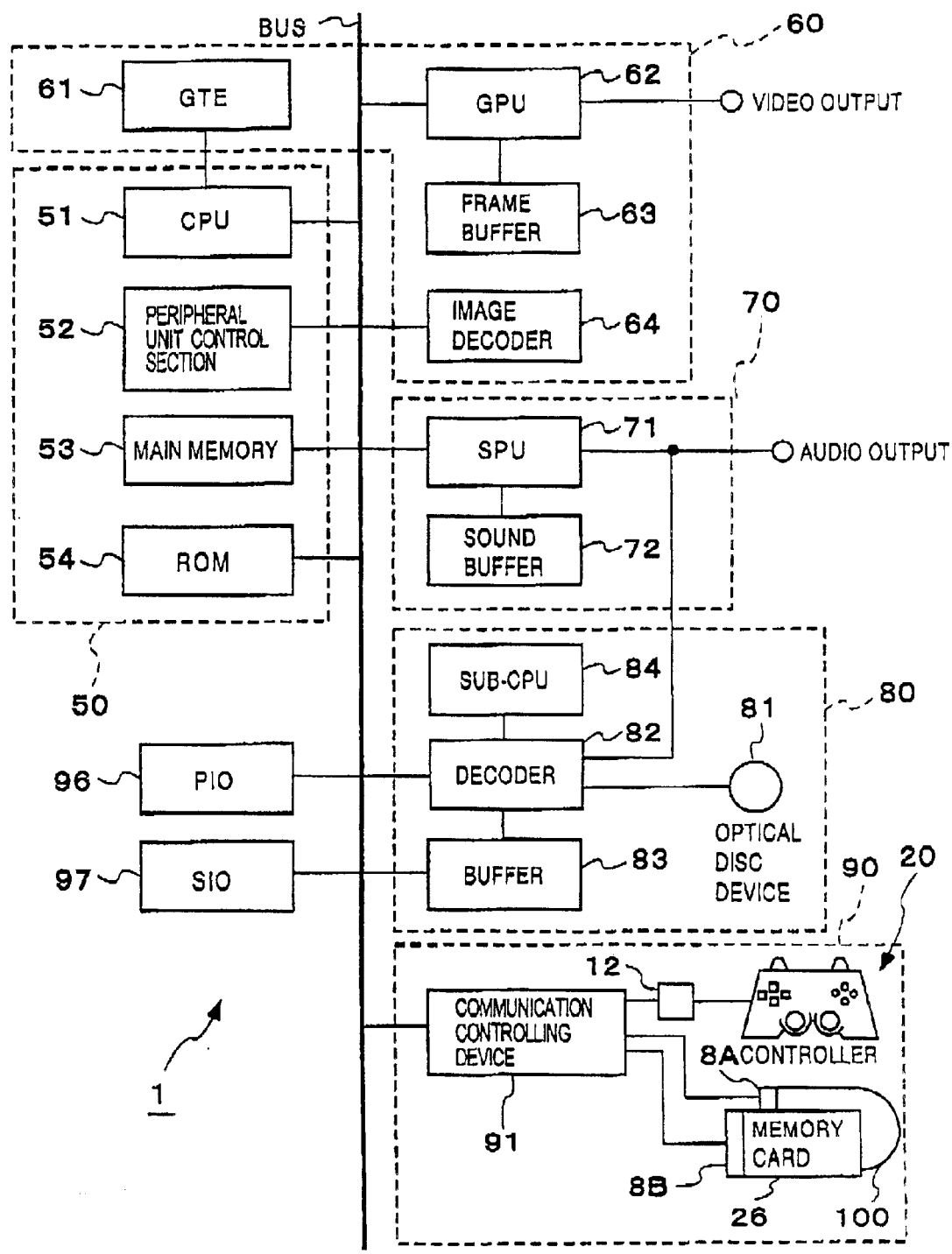
FIG. 4 is a block diagram exemplifying a hardware structure of the entertainment apparatus 1 shown in FIG. 1.

Next, a constitution of the entertainment apparatus 1 is shown in FIG. 4.

As shown in FIG. 4, the entertainment apparatus 1 comprises: a control system 50 including a central processing unit (CPU) 51, peripheral units and the like; a graphic system 60 including a graphic processing unit (GPU) 62 allowing a frame buffer 63 to carry out drawing thereon, and the like; a sound system 70 including a sound processing unit (SPU) 71 generating an audio signal such as a musical sound and an effect sound, and the like; an optical disc control section 80 for controlling an optical disc on which an application program and multimedia data are stored; a communication control section 90 for controlling input/output of a signal from the controller 20 to which an instruction from the player is inputted and for controlling input/output of data from a portable electronic appliance 100 and a memory card 26 storing a setting of a game; a bus BUS connected to the above described sections and systems; and the like.

The control system 50 comprises the CPU 51; a peripheral unit control section 52 for performing an interruption control and direct memory access (DMA) transfer control; a main memory 53 comprising a random access memory (RAM); and a read only memory (ROM) 54 storing a program such as so called an operating system, which controls the main memory 53, the graphic system 60, the sound system 70 and the like.

The CPU 51 executes the operating system stored in the ROM 54, thus controlling the whole of the entertainment apparatus 1, and the CPU 51 is composed of, for example, a RISC-CPU.

In the entertainment apparatus 1, upon turning on a power, the CPU 51 of the control system 50 executes the operating system stored in the ROM 54. Thus, the CPU 51 controls the graphic system 60, the sound system 70 and the like.

When the operating system is executed, the CPU 51 performs an initialization such as an operation confirmation for the whole of the entertainment apparatus 1. Thereafter, the CPU 51 controls the optical disc control section 80, and executes an application program such as a game stored on the optical disc. By executing the program of the game, the CPU 51 controls the graphic system 60, the sound system 70 and the like in response to an input from the player, and controls an image display and generation of the effect sound and the musical sound.

The graphic system 60 comprises a geometry transfer engine (GTE) 61 for performing a processing of a coordinate transformation and the like; the GPU 62 for carrying out the drawing in accordance with an instruction for the drawing from the CPU 51; the frame buffer 63 for storing an image drawn by the GPU 62; and an image decoder 64 for decoding image data, which has been compressed by an orthogonal transformation such as a discrete cosine transform and then coded.

The GTE 61 comprises a parallel operation mechanism for executing a plurality of operations parallelly, and performs calculations of a matrix, a vector and the like such as the coordinate transformation. To be concrete, the GTE 61 constitutes a virtual three dimensional object by gathering triangular polygons when an application program such as a game, stored in an optical disc, uses so called a 3D graphic. Then, the GTE 61 performs various calculations for generating an image obtained by photographing the three dimensional object with a virtual camera. Specifically, the various calculations include a perspective transformation (a calculation of the coordinate value when vertexes of the polygons constituting the three dimensional object are projected onto a virtual camera screen), which is adopted in performing rendering.

Next, the GPU 62 performs rendering of the three dimensional object for the frame buffer 63 in response to an instruction from the CPU 51 while using the GTE 61 if necessary, and then forms an image. Subsequently, the GPU 62 outputs a video signal representing the image formed. As a technique of erasing shadow lines and shadow planes used for rendering, a Z buffer method, a scan line method, a ray tracing method and the like are employed. As a shading technique for shading, a flat shading method, a glow shading method, a ray tracing method and the like are employed. As a technique for expressing a surface material and pattern of the three dimensional object, a texture mapping and the like are employed.

The frame buffer 63 is composed of, so called a dual port RAM, and constituted so as to be able to simultaneously perform rendering of the GPU 62, or a transfer from the main memory and reading-out for a display. In the frame buffer 63, in addition to an image area in which the rendering and the reading-out for a display are performed, a texture area in which a texture used for the texture mapping is stored is provided.

The CPU 51 controls the image decoder 64 so that the image decoder 64 decodes image data of either a still picture or a moving picture, which is stored in the main memory 53, and allows the main memory 53 to store the decoded image data. The decoded image data is stored in the frame buffer 63 via the GPU 62, whereby the decoded image data is used as a background of an image to be subjected to the rendering by the foregoing GPU 62.

The sound system 70 comprises the SPU 71 for outputting an audio signal such as a musical sound and an effect sound based on an instruction from the CPU 51 and a sound buffer 72 in which waveform data and the like is stored by the SPU 71.

The SPU 71 comprises: an ADPCM decoding function to reproduce sound data that has been subjected to adaptive differential PCM (ADPCM); a reproduction function to reproduce an audio signal such as the effect sound and output the audio signal, by reproducing the waveform data stored in the sound buffer 72; and a modulation function to modulate the waveform data stored in the sound buffer 72, thus reproducing the modulated waveform data. With the provision of such functions, the sound system 70 is constituted so as to be used as so called a sampling sound source that generates an audio signal such as the musical sound and the effect sound based on the waveform data which is stored in the sound buffer 72 in response to an instruction from the GPU 51.

The optical disc control section 80 comprises: an optical disc device 81 for reproducing a program, data and the like stored in the optical disc; a decoder 82 for decoding a program, data and the like to which, for example, an error correction code (ECC) is added, stored in the optical disc; and a buffer 83 for making reading-out of the data from the optical disc faster by temporarily storing the data from the optical disc device 81. A sub CPU 84 is connected to the decoder 82.

As the sound data stored in the optical disc, which is read out by the optical disc device 81, there is so called PCM data obtained by an A/D conversion of the audio signal in addition to the foregoing ADPCM data. The ADPCM data is decoded by the decoder 82, and then supplied to the foregoing SPU 71. The ADPCM data is subjected to a D/A conversion by the SPU 71, and then outputted as the musical sound, the effect sound and the like from a sound apparatus such as an audio device connected to the entertainment apparatus 1. Furthermore, the PCM data is subjected to a processing such as a D/A conversion and the like by the SPU 71, and then outputted as the musical sound, the effect sound and the like from the sound apparatus.

The communication control section 90 comprises a communication controlling device 91 to control a communication with the CPU 51 through the bus BUS. In the communication controlling device 91, provided are: a controller connection portion 12 connected to the controller 20 for entering an instruction from the player; and memory card insertion portions 8A and 8B connected to the memory card 26 as an auxiliary memory device for storing game setting data and the like and the portable electronic appliance 100.

In order to enter the instruction from the player, the controller 20 connected to the controller connection portion 12 transmits states of the foregoing buttons and the manipulation portion to the communication controlling device 91 by a synchronous communication, in response to an instruction from the communication controlling device 91. Then, the communication controlling device 91 transmits the states of the foregoing buttons and the manipulation portion of the controller 20 to the CPU 51.

Thus, the instruction from the player is entered to the CPU 51, and the CPU 51 executes processings in accordance with the instruction from the player based on a game program that is being executed. To be concrete, the CPU 51 generates an image including a controlled object in cooperation with other portions of the control system 70 and the graphic system 60, and allows the display screen of the display device to display the image. In accordance with the instruction from the player, which was entered to the controller 20, the CPU 51 sequentially generates images in which a display position of the controller object and a posture thereof are changed, and allows the display screen of the display device to display these images. Note that a background of the image is also changed if necessary. Thus, the CPU 51 generates a moving picture as if the controlled object is controlled in response to the manipulation contents of the player entered to the controller 20. In addition, the CPU 51 controls a sound and music output from the sound apparatus in cooperation with the sound system 70 if needs arise.

Hereupon, the image data must be transferred at high speed among the main memory 53, the GPU 62, the image decoder 64 and the decoder 82 when reading-out of the program, the display of the image and the drawing are carried out. Accordingly, in the entertainment apparatus 1, so called a DMA transfer can be performed, in which data is directly transferred among the main memory 53, the GPU 62, the image decoder 64 and the decoder 82 by a control of the peripheral unit control section 52 without intervention of the CPU 51 as described above. Thus, a load of the CPU 51 due to the data transfer can be reduced, and a high speed data transfer can be performed.

Furthermore, when the setting data of the game that is being executed must be stored, the CPU 51 transfers the data to be stored to the communication controlling device 91, and the communication controlling device 91 writes the data from the CPU 51 in the memory card 26 or the portable electronic appliance 100, which are inserted in the slot of either the memory card insertion portion 8A or the memory card insertion portion 8B.

Here, a protection circuit for preventing electrical destruction incorporated in the communication controlling device 91. The memory card 26 and the portable electronic appliance 100 are separated from the bus BUS, and freely removable from the main body 2 in a state where the power is being supplied to the main body 2 of the entertainment apparatus 1. Accordingly, when the memory card 26 and the portable electronic appliance 100 lack in storage capacity, a new memory card, etc., can be inserted without breaking the power of the apparatus body. Thus, a new memory card is inserted and new data can be written therein, so that game data that must be backed up is never lost.

Note that a parallel I/O interface (PIO) 96 and a serial I/O interface (SIO) 97 serve as an interface for connecting the entertainment apparatus 1 to the memory card 26 or the portable electronic appliance 100.

The hardware structure of the entertainment apparatus 1 was described in the above.

Next, a flight simulation game will be described, which is realized in such a manner that in the entertainment apparatus 1 constituted as described above, the CPU 51 executes an application program read out from an optical disc inserted in the disc inserting portion 3.

The flight simulation game means a game executed in the following manner. By the use of the controller 20 connected to the entertainment apparatus 1, a player controls the controlled object, which represents an airplane, to allow the controlled object to move in the virtual three dimensional field, and thus the player can experience an operation of the airplane virtually. The entertainment apparatus 1 generates a CG animation image obtained by photographing the controlled object moving in the three dimensional field with the virtual camera, and displays the CG animation image on the display screen of the display device connected to the entertainment apparatus 1.

A data structure of the optical disc will be first described.

Figure 5:
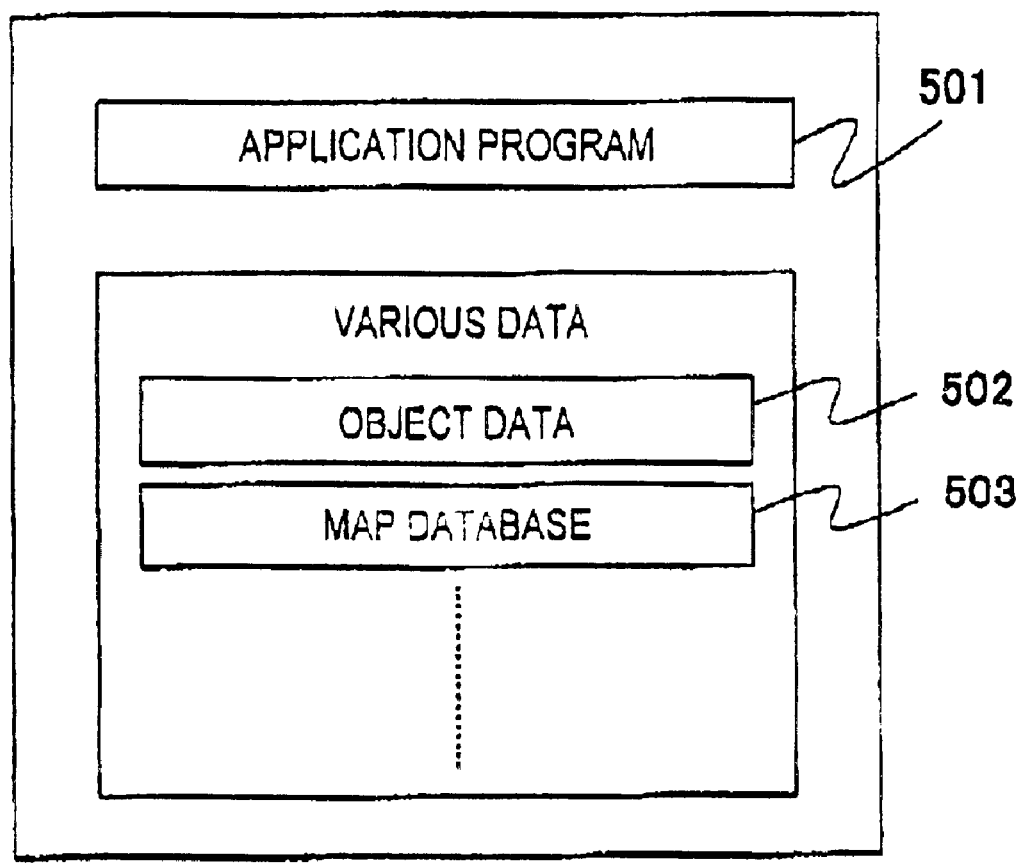
FIG. 5 is a block diagram for explaining a data structure of an optical disk 85 inserted in a disk inserting portion 3 of the entertainment apparatus 1.

FIG. 5 is a block diagram for explaining the data structure of the optical disk 85 inserted in the disk inserting portion 3.

As shown in FIG. 5, an application program (PG) 501 for realizing a flight simulation game, and various kinds of data including object data (DA) 502 and a map database (DB) 503 are stored in the optical disc 85.

In the object data DA 502, stored is a variety of information necessary for specifying a three dimensional shape and a texture, etc., of the controlled object, which represents an airplane and which is controlled by the use of the controller 20 by the player in the flight simulation game. In the map database DB503, stored in a variety of information concerning map constituent elements for specifying topography in the virtual three dimensional field in the flight simulation game, in which the controlled object moves.

Next, a software structure for realizing the flight simulation game, which is constructed on the entertainment apparatus 1, will be described.

Figure 6:
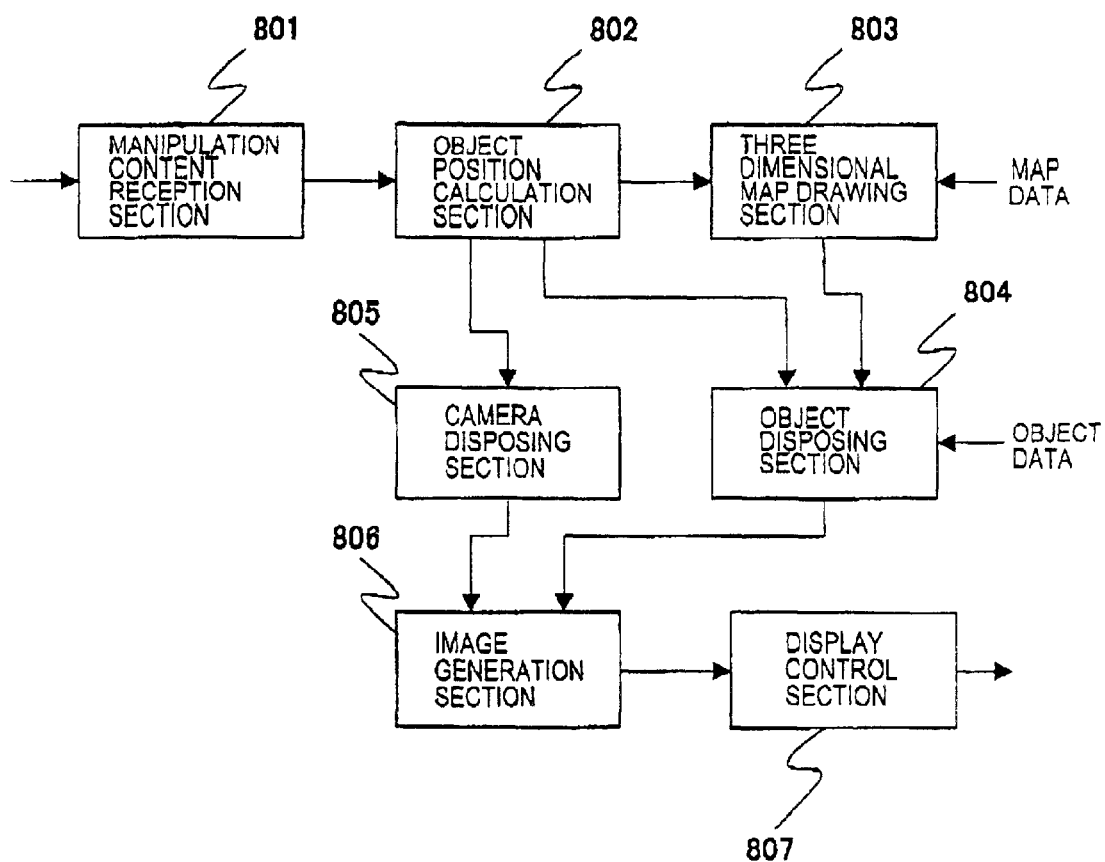
FIG. 6 is a block diagram showing a software structure for realizing a flight simulation game, which is constructed on the entertainment apparatus 1 shown in FIG. 4.

FIG. 6 is a block diagram showing the software structure for realizing the flight simulation game, which is constructed on the entertainment apparatus 1. Constituent elements shown in FIG. 6 are realized as processes in such a manner that the CPU 51 executes the application PG 501 read out by the optical disc control section 80 from the optical disc 85 which is inserted in the disc inserting portion 3 and which is loaded on the main memory 53.

In FIG. 6, a manipulation content reception section 801 determines a moving speed of the controlled object and a moving direction thereof, which moves in the three dimensional field, in response to the instruction of the player entered in the controller 20. This processing is performed periodically.

Here, the moving speed of the controlled object is determined by allowing any one of the first and second manipulation portions 21 and 22, and the L button 23L, and the R button 23R of the controller 20 to possess a same function as that of a throttle.

Specifically, when a detection signal of the button possessing the same function as that of the throttle is being outputted from the manipulation apparatus 20, it is judged that the throttle is in the on-state. When the detection signal of the button is not being outputted, it is decided that the throttle is in the off-state. When it is judged that the throttle is in the on-state, a certain speed is added to the moving speed of the controlled object determined the last time, whereby the moving speed of the controlled object is determined. The certain speed is obtained from a predetermined acceleration in response to the throttle-on-state and from duration time after the moving speed was determined last time. For the duration, the throttle is in the on-state. On the other hand, when it is decided that the throttle is in the off-state, another certain speed is subtracted from the moving speed of the controlled object determined last time, whereby the moving speed of the controlled object is determined. Another certain speed is obtained from a predetermined deceleration in response to the throttle-off-state and from the duration time after the moving speed was determined last time. For the duration, the throttle is in the off-state.

Furthermore, the moving direction of the controlled object is determined, for example, by allowing the manipulation sticks 31a and 32a of the controller 20 to possess a same function as that of a control stick.

Specifically, by the manipulation performed for the manipulation sticks 31a and 32a, a bank of the airplane represented by the controlled object is determined depending on a value of the X coordinate component obtained from a signal, which corresponds to the coordinate value on the X-Y coordinate, the signal being outputted from the controller 20. A rise and drop of the nose of the airplane is determined depending on a value of the Y-coordinate component obtained therefrom.

To be concrete, in FIG. 3, when the value of the X-coordinate component ranges from 128 to 255, the airplane shall tilt greatly to the right as the value of the coordinate component is larger. When the value of the X-coordinate component ranges from 0 to 126, the airplane shall tilt greatly to the left as the value of the coordinate component is smaller. When the value of the X-coordinate component is equal to 127, the airplane shall not bank. Furthermore, when the value of the Y-coordinate component ranges from 128 to 255, the nose of the airplane shall rise greatly as the value of the Y-coordinate component is larger. When the value of the Y-coordinate component ranges from 0 to 126, the nose of the airplane shall lower greatly as the value of the Y-coordinate component is smaller. Then when the value of the Y-coordinate component is equal to 127, the nose of the airplane shall not rise and drop.

The manipulation content reception section 801 obtains a change amount of the relative moving direction to the moving direction of the controlled object determined last time. The change amount is obtained based on the bank of the airplane represented by the controlled object and the rise and drop of the nose of the airplane. The bank of the airplane and the rise and drop of the nose of the airplane are specified by a signal depending on the coordinate value on the X-Y coordinate, the signal being outputted from the controller 20. The obtained change amount of the relative moving direction is added to the moving direction of the controlled object determined last time. Thus, the moving direction of the controlled object is determined.

By the way, in the actual world, a very high level operation is required to shift the airplane to a perfect circular flight by the use of the control stick. For this reason, if the manipulation sticks 31a and 32a of the controller 20 are merely allowed to possess the same function just as that of the control stick, it is too difficult for an unskilled player to control the controlled object, and the player might not enjoy the flight simulation game satisfactorily.

Accordingly, in this embodiment, when the coordinate value on the X-Y coordinate represented by the signal is within a predetermined range, the manipulation content reception section 801 judges that the controlled object is allowed to perform a predetermined motion, that is, a motion considered for a player to be difficult to operate in the actual world. Note that this signal is outputted from the controller 20 to the manipulation content reception section 801 by the manipulation performed to the manipulation sticks 31a and 32a. Then, the moving direction of the controlled object is determined to be a direction required for performing this motion. In the example shown in FIG. 3, when the X-coordinate value on the X-Y coordinate is equal to 240 or more and Y-coordinate value on the X-Y coordinate is equal to 15 or less, the manipulation content reception section 801 judges that the controlled object shall be allowed to make a rapid circular flight to the upper right. When the X-coordinate value on the X-Y coordinate is equal to 15 or less and Y-coordinate value on the X-Y coordinate is equal to 15 or less, the manipulation content reception section 801 judges that the controlled object shall be allowed to make a rapid circular flight to the upper left. The moving direction of the controlled object is determined to be a direction required to perform the rapid circular flight.

For example, when the manipulation content reception section 801 judges that the controlled object is allowed to make the rapid circular flight to the upper right, the airplane represented by the controlled object shall tilt to the right by 45 degrees, and shall rise its nose by 45 degrees. Then, the manipulation content reception section 801 determines the moving direction of the controlled object based on the moving direction of the controlled object determined last time. When the manipulation content reception section 801 judges that the controlled object is allowed to make the rapid circular flight to the upper left, the airplane shall tilt to the left by 45 degrees, and shall rise its nose by 45 degrees. Then, the manipulation content reception section 801 determines the moving direction of the controlled object based on the moving direction of the controlled object determined last time.

In FIG. 6, the object position calculation section 802 performs periodically processings for calculating a position and posture of the controlled object in the virtual three dimensional field.

To be concrete, the object position calculation section 802 calculates the present position of the controlled object, based on the position and posture (moving direction) of the controlled object calculated last time and the latest moving speed thereof determined by the manipulation content reception section 801. Furthermore, the object position calculation section 802 calculates the present posture of the controlled object in accordance with the latest moving direction thereof determined by the manipulation content reception section 801.

Directly from the map database DB503 stored in the optical disc 85, a three dimensional map drawing section 803 reads out map constituent elements to be disposed around the position of the controlled object calculated by the object position calculation section 802. Alternatively, the three dimensional map drawing section 803 reads out the map constituent elements from the map database DB503 which are read out from the optical memory 85 and temporarily stored in the main memory 53. Then, the three dimensional map drawing section 803 disposes the constituent elements in the three dimensional field. Thus, topography to be expanded around the position of the controlled object is generated.

Note that the three dimensional map drawing section 803 is not always required to perform the topography generation processing every time the position of the controlled object is calculated by the object position calculation section 802. For example, the three dimensional map drawing section 803 may perform the topography generation processing every time position of the controlled object is calculated by the object position calculation section 802 plural times. In this case, a range where the controlled object can move is taken into consideration in the processing for calculating the position of the controlled object, which is performed by the object position calculation section 802 plural times. Note that this range can be estimated based on the maximum moving speed of the controlled object previously set. Then the map constituent elements to be disposed around this range are read out from the map database DB503, and disposed in the three dimensional field satisfactorily.

In the three dimensional field in which the topography is expanded by the three dimensional map drawing section 803, an object disposing section 804 disposes the controlled object at the latest position thereof calculated by the object position calculation section 802. A thee dimensional shape and the like are specified by the object data DA502 stored in the optical disc 85. On this occasion, the controlled object is disposed so that the posture of the controlled object is identical to that of the latest controlled object calculated by the object position calculation section 802.

Note that the three dimensional map drawing section 803 and the object disposing section 804 are realized in such a manner that the CPU 51 uses, for example, the GTE 61 in FIG. 4.

The camera disposing section 805 performs a processing for settling a disposing position of the virtual camera, that is, a viewpoint of the virtual camera, and a direction thereof, that is, a sight line direction and a tilt of the camera around the sight line direction as an axis. The disposing position and direction of the virtual camera are used for generating a two dimensional image from the three dimensional field in which the topography and the controlled object are disposed by the three dimensional map drawing section 803 and the object disposing section 804. This processing is performed every time the position and posture of the controlled object are calculated by the object position calculation section 802. An example of the concrete processing for settling the disposing position and direction of the virtual camera in the camera setting section 805 will be described below.

Figure 7:
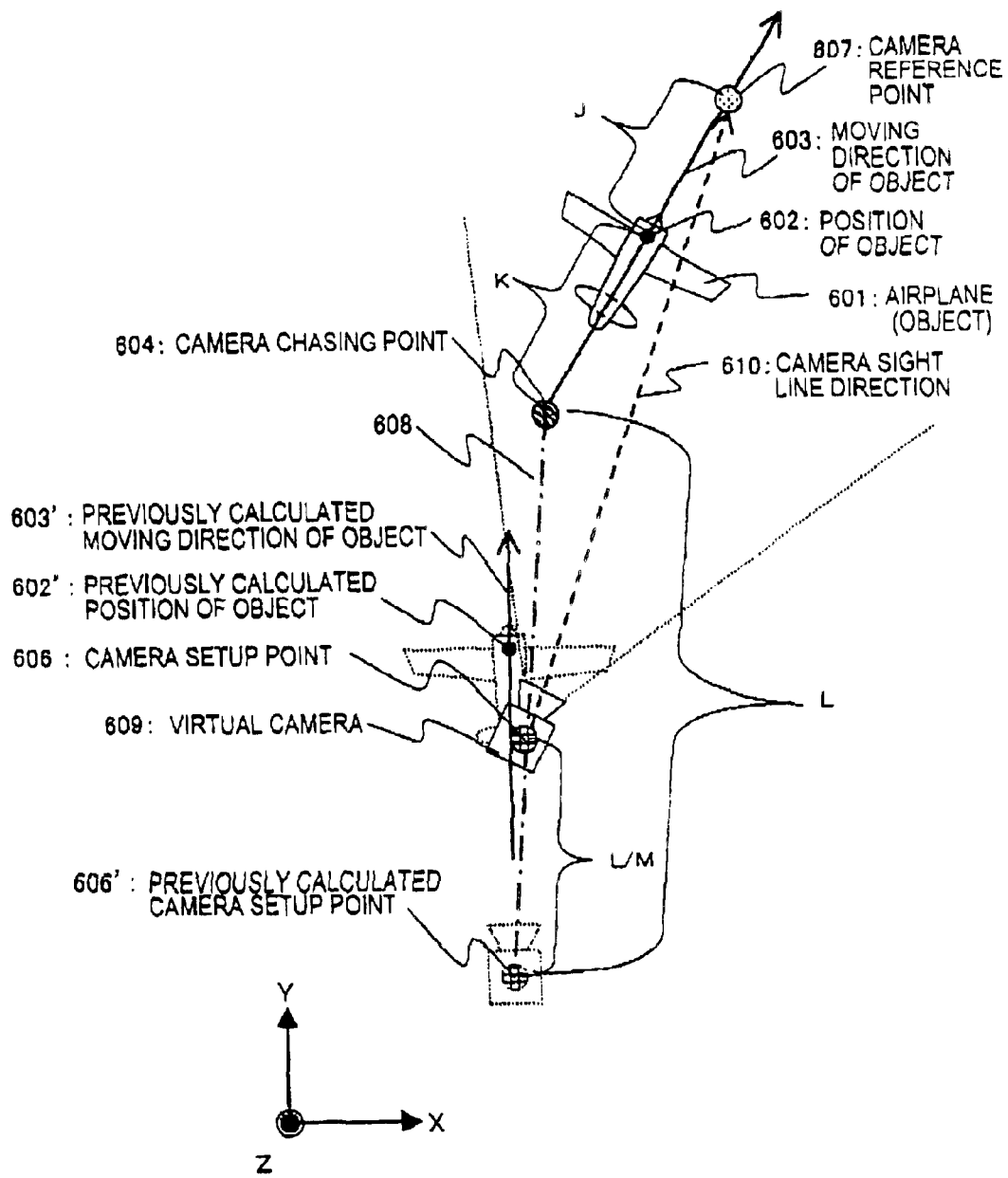
FIG. 7 is an explanatory view for explaining a positional relation between an object 601 to be controlled (hereinafter referred to as a controlled object) and a virtual camera 609 disposed in a three dimensional field by a camera disposing section 805 shown in FIG. 6.
Figure 9:
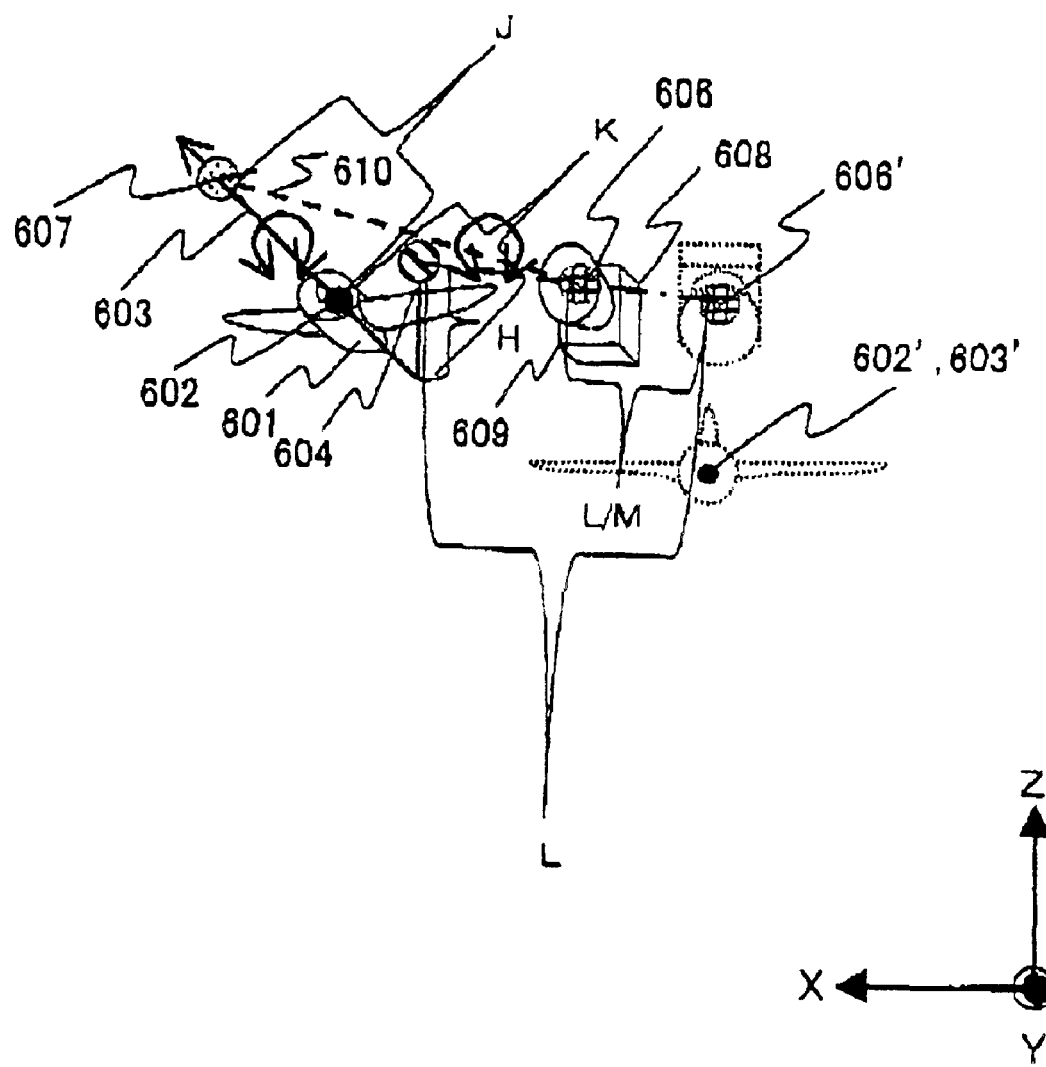
FIG. 9 is an explanatory view for explaining a positional relation between the controlled object 601 and the virtual camera 609 disposed in the three dimensional field by the camera disposing section 805 shown in FIG. 6.

FIGS. 7 to 9 are drawings for explaining a positional relation between the controlled object 601 and the virtual camera 609 in this embodiment.

FIG. 7 shows a state in which the object 601 and the virtual camera 609 disposed in the three dimensional field are overlooked just from above (an infinitely long distance of the Z-axis), and FIG. 8 shows a state in which the object 601 and the virtual camera 609 disposed in the three dimensional field are viewed just from the side (an infinitely long distance of the X-axis). FIG. 9 shows a state in which the object 601 and the virtual camera 609 disposed in the three dimensional field are viewed just from the side (an infinitely long distance of the Y-axis). Note that in these drawings, illustrations of the map constituent elements disposed in the three dimensional field are omitted.

(1) Disposing Position of Virtual Camera (Camera Setup Point)

As shown in FIGS. 7 to 9, the camera disposing section 805 settles the camera setup point 606, which is the disposition point of the virtual camera 609 at a position satisfying the following conditions ① to ③.

①: A camera chasing point 604 is settled at a position higher by a predetermined value H than that located to the rear of the position 602 by the distance K, the position 602 being on the line 603 along the moving direction of the controlled object 601 newly calculated by the manipulation content reception section 801. The line 603 passes through the position 602 of the controlled object 601 newly calculated by the object position calculation section 802.

②: A camera setup point 606 is settled at a position, which approaches to the camera chasing point 604 from the camera setup point 606' calculated last time by the distance L/M. The distance L/M is obtained by dividing the distance L between the camera chasing point 604 and the camera chasing point 606' by the predetermined value M. Accordingly, the camera setup point 606, the camera setup point 606' calculated last time and the camera chasing point 604 satisfy the following relations.

X coordinate value of point 606=(X coordinate value of point 604−X coordinate value of point 606')/M+X coordinate value of point 606'

Y coordinate value of point 606=(Y coordinate value of point 604−Y coordinate value of point 606')/M+Y coordinate value of point 606'

Z coordinate value of point 606=(Z coordinate value of point 604−Z coordinate value of point 606')/M+Z coordinate value of point 606'

③: In the relation ①, the distance K is set so as to be shorter, as the moving speed of the controlled object newly calculated by the manipulation content reception section 801 is increased. In other words, the distance K is set so that the camera chasing point 604 approaches to the controlled object 601. For example, the distance K is represented as k when the moving speed of the controlled object is equal to A, and the distance K is set to satisfy the following equation.

$$K=k-a(B-A)$$

where B is the moving speed of the controlled object newly calculated by the manipulation content reception section 801, and a is a predetermined coefficient. The coefficient a is set so as to satisfy the following conditions in the above described relation with the predetermined value M expressed in the condition ②.

Specifically, though the camera chasing point 604 approaches nearer to the controlled object 601 as the moving speed of the controlled object 601 is increased, the coefficient a and the predetermined value M are set so that the camera setup point 606 goes far behind the controlled object 601, that is, the camera setup point 606 moves backward relative to the moving direction of the controlled object 601 as the moving speed of the controlled object 601 is increased.

In the initial state (at the time of starting the game), the camera setup point 606 may be settled at a predetermined position determined fixedly based on the relative positional relation between the camera setup point 606 and the controlled object 601.

(2) Direction of Camera (Direction of Sight Line of Camera)

As shown in FIGS. 7 to 9, the camera disposing section 805 settles the camera sight line direction 610 so that the virtual camera 609 set at the camera setup point 606 is pointed at a camera reference point 607. The camera disposing section 805 settles the camera reference point 607 at a position satisfying the following conditions ① and ②.

①: The camera reference point 607 is settled at a position in front of the position 602 by the distance J, the position being on the line 603 along the moving direction of the controlled object newly calculated by the manipulation content reception section 801. The line 603 passes through the position 602 of the controlled object 601 newly calculated by the object position calculation section 802.

②: In the condition ①, the distance J is set so as to be longer, that is, so that the camera reference point 607 leaves the controlled object 601 far, as the moving speed of the controlled object, which is newly calculated by the manipulation content reception section 801, is increased. For example, the distance J is represented as j when the moving speed of the controlled object is equal to A, and the distance J is set so as to satisfy the following equation, $$J=j+b(B-A)$$

where B represents the moving speed of the controlled object newly calculated by the manipulation content reception section 801, and b represents a predetermined coefficient.

(3) Direction of Camera (Tilt of Camera Around Camera Sight Line Direction as Axis)

As shown in FIG. 9, when the controlled object banks around the line 603 as an axis, that is, when the manipulation content reception section 801 receives the manipulation content to allow the airplane represented as the controlled object 601 to bank left and right, the virtual camera 609 is rotated around the camera sight line direction 610 as an axis in accordance with the bank thereof. When the controlled object 601 rotates around the line 603 as an axis, the virtual camera 609 is rotated around the camera sight line direction 610 as an axis.

Figure 10:
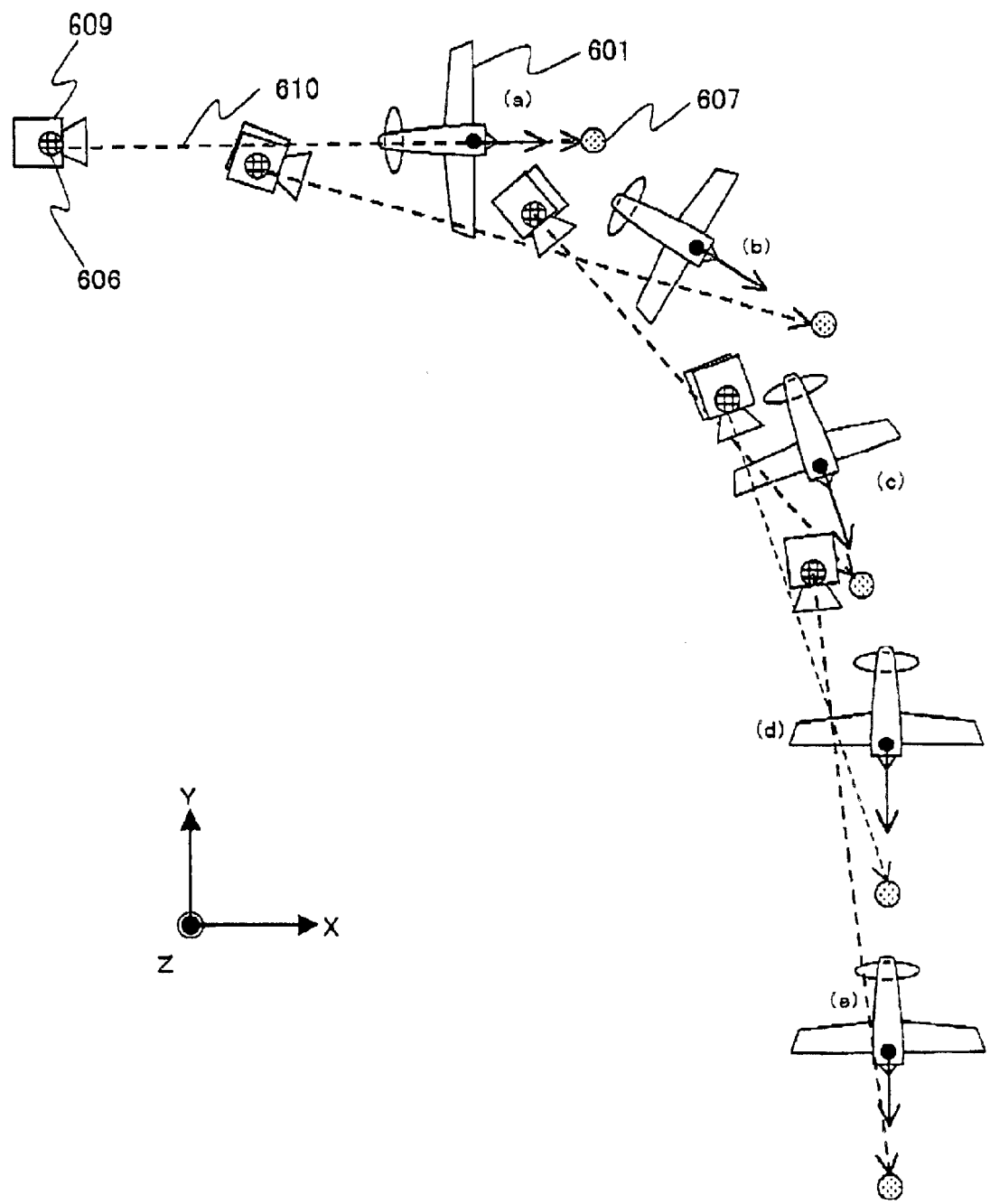
FIG. 10 is an explanatory view for explaining how the virtual camera 609, which is disposed in the three dimensional field by the camera disposing section 805 shown in FIG. 6, behaves for a motion of the controlled object 601.
Figure 11:
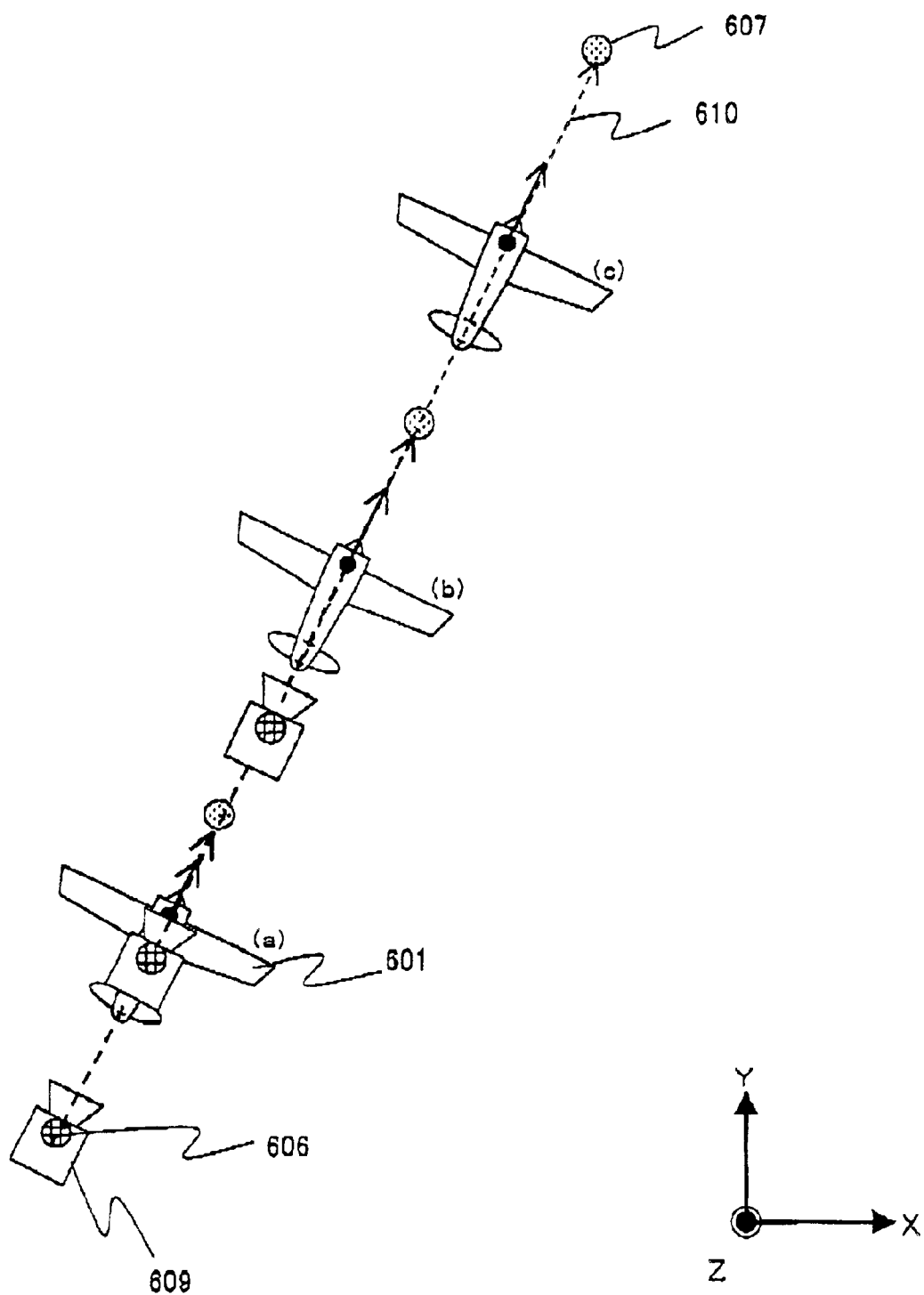
FIG. 11 is an explanatory view for explaining how the virtual camera 609, which is disposed in the three dimensional field by the camera disposing section 805 shown in FIG. 6, behaves for a motion of the controlled object 601.

FIGS. 10 and 11 are explanatory views for explaining how the virtual camera 609 behaves for a motion of the controlled object 601 in the present embodiment.

Here, FIG. 10 shows a relation between the controlled object 601 and the virtual camera 609 when the controlled object 601 shifts from a straight advance state at a constant speed to a clockwise circular flight state. FIG. 11 shows a relation between the controlled object 601 and the virtual camera 609 when the controlled object 601 increases the moving speed gradually in the straight advance state. Note that FIGS. 10 and 11 show a state where the controlled object 601 and the virtual camera 609 are overlooked just from above (an infinitely long distance of the Z-axis), and illustrations of map constituent elements disposed in the three dimensional field are omitted in FIGS. 10 and 11.

Figure 12A:
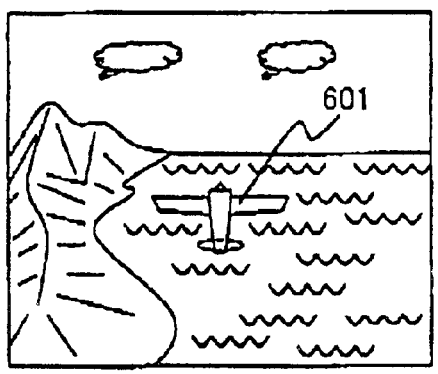
FIGS. 12A to 12E show examples of pictorial images obtained by photographing the controlled object 601 with the virtual camera 609 disposed as shown in FIG. 10.
Figure 12B:
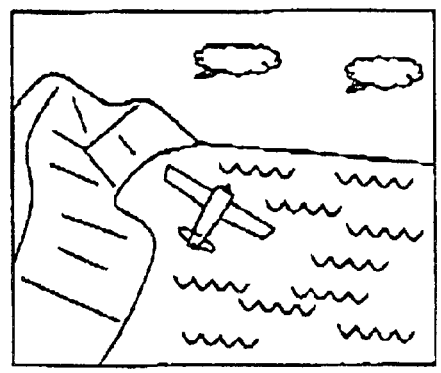
Figure 12C:
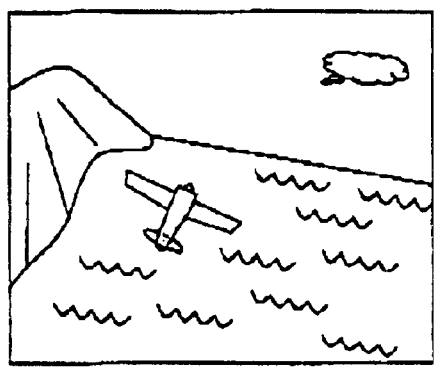
Figure 12D:
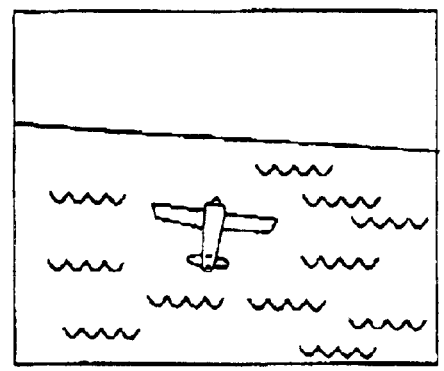
Figure 12E:
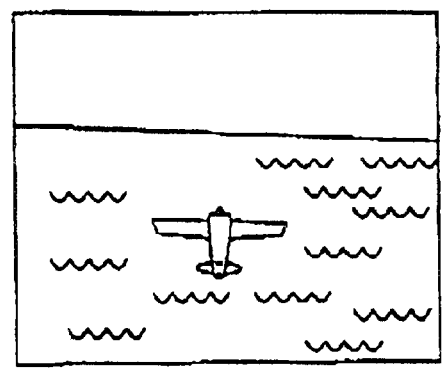

FIGS. 12A to 12E exemplify pictorial images obtained by photographing the controlled object 601 with the virtual camera 609 disposed as shown in FIG. 10. FIG. 12A shows a pictorial image photographed by the virtual camera 609 when the controlled object is at the position (a) of FIG. 10, and FIG. 12B shows a pictorial image photographed by the virtual camera 609 when the controlled object is at the position (b) of FIG. 10. FIG. 12C shows a pictorial image photographed by the virtual camera 609 when the controlled object is at the position (c) of FIG. 10, and FIG. 12D shows a pictorial image photographed by the virtual camera 609 when the controlled object is at the position (d) of FIG. 10. FIG. 12E shows a pictorial image photographed by the virtual camera 609 when the controlled object is at the position (e) of FIG. 10.

Figure 13A:
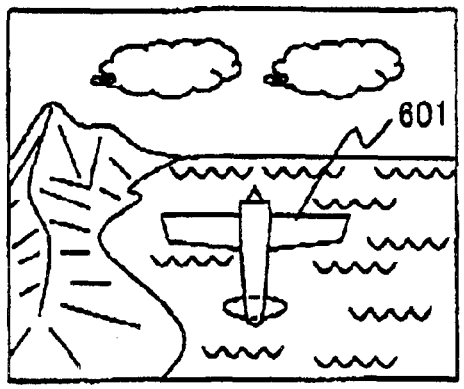
FIGS. 13A to 13C show examples of pictorial images obtained by photographing the controlled object 601 with the virtual camera 609 disposed as shown in FIG. 11.
Figure 13B:
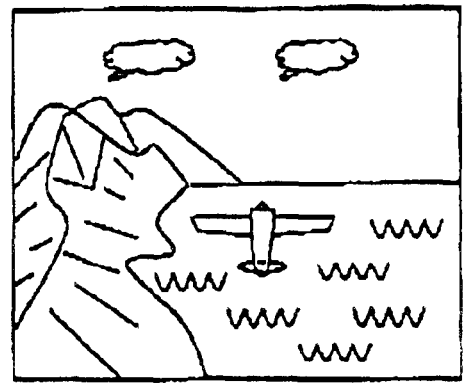
Figure 13C:
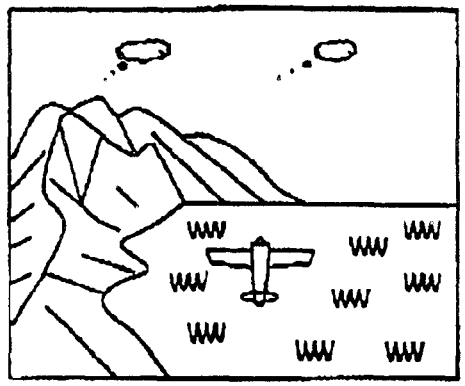
Figure 15A:
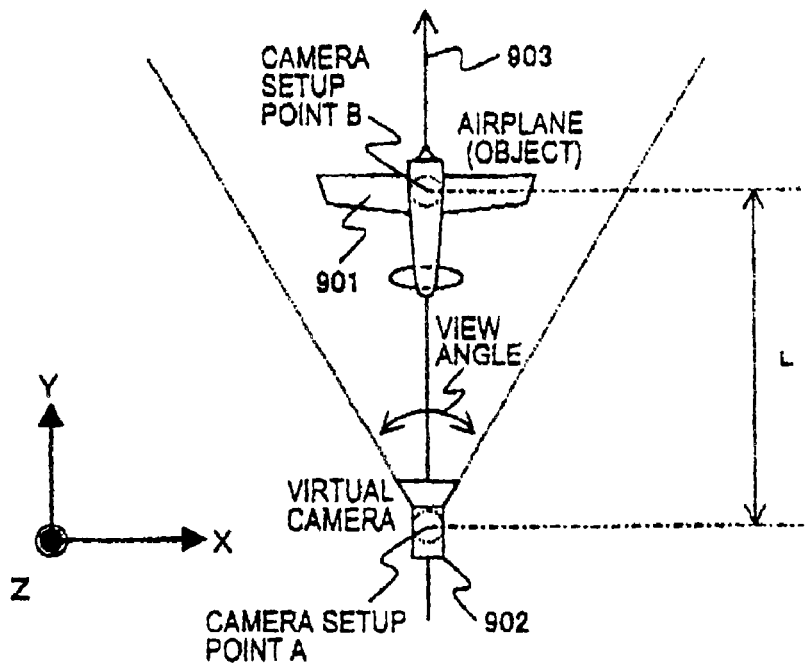
FIGS. 15A and 15B are explanatory views for explaining a positional relation between an object (an object representing an airplane) 901 and a virtual camera 902 in a conventional entertainment apparatus for performing a flight simulation.
Figure 15B:
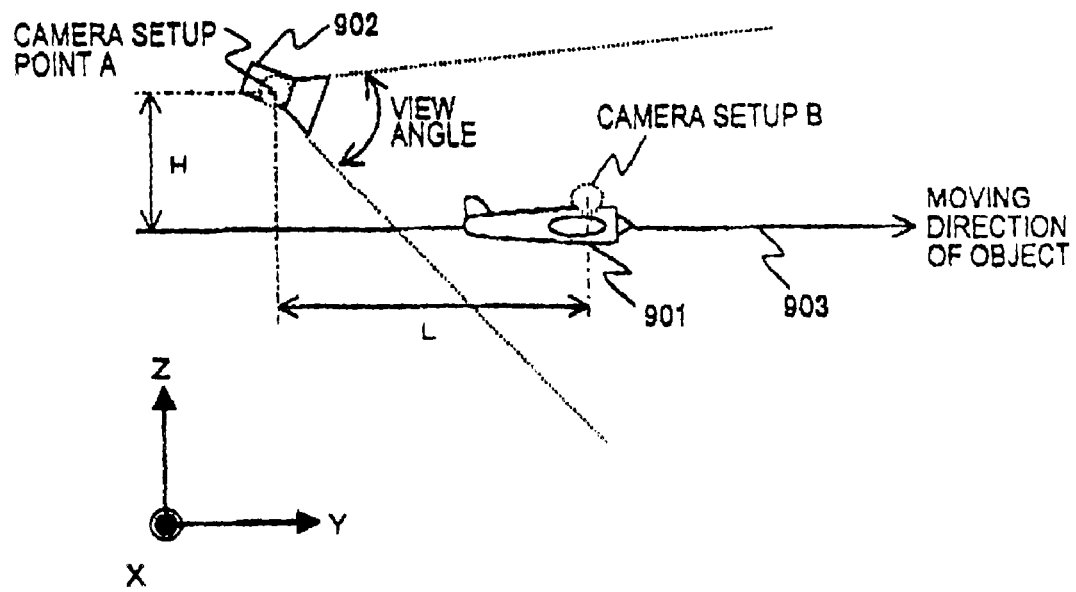
Figure 16A:
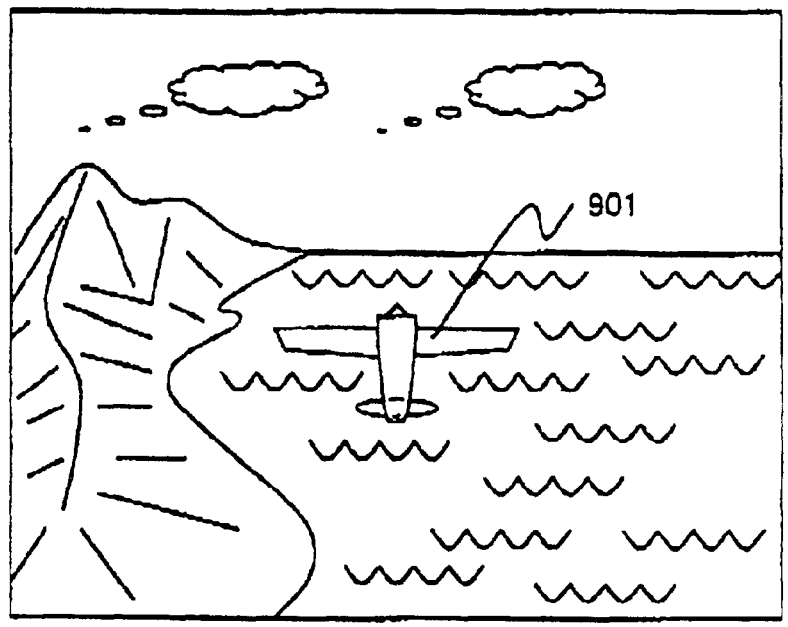
FIGS. 16A and 16B show pictorial images obtained by photographing an object 901 with the virtual camera 902 disposed as shown in FIGS. 15A and 15B.
Figure 16B:
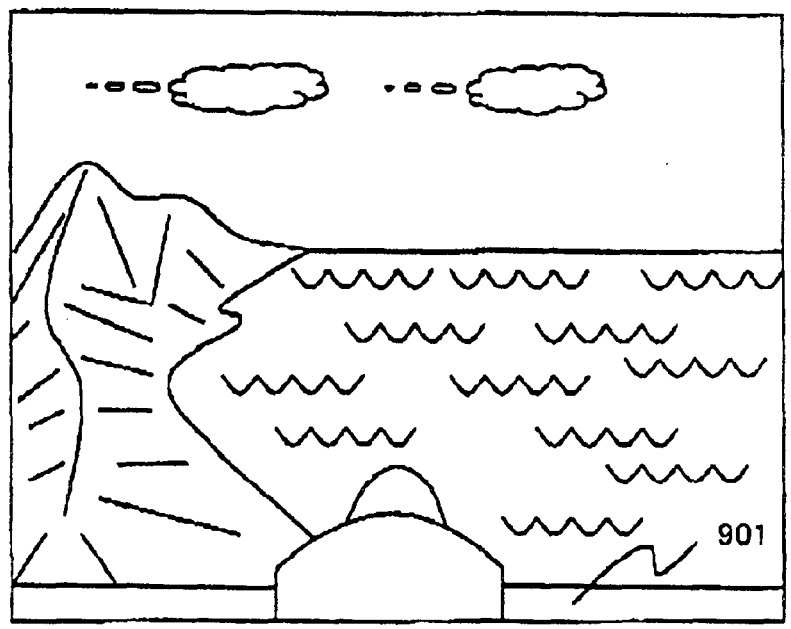

FIGS. 13A to 13C exemplify pictorial images obtained by photographing the controlled object 601 with the virtual camera 609 disposed as shown in FIG. 11. FIG. 13A shows a pictorial image photographed by the virtual camera 609 when the controlled object is at the position (a) of FIG. 11, and FIG. 13B shows a pictorial image photographed by the virtual camera 609 when the controlled object is at the position (b) of FIG. 11. FIG. 13C shows a pictorial image photographed by the virtual camera 609 when the controlled object is at the position (c) of FIG. 11.

As apparent from FIG. 10 and FIGS. 12A to 12E, the disposing position and direction of the virtual camera 609 are set so that the foregoing conditions (1) to (3) are satisfied, whereby the camera setup point 606' calculated last time is taken into consideration for the camera setup point 606. Accordingly, the virtual camera 609 behaves so as to chase the controlled object 601 behind with little delay for the motion of the controlled object 601. When the controlled object 601 rotates around its moving direction as an axis, that is, when the controlled object banks left and right, also the virtual camera 609 rotates around the camera sight line direction 610 as an axis depending on the rotation of the controlled object 601.

As apparent from FIG. 11 and FIGS. 13A to 13C, the disposing position and direction of the virtual camera 609 are set so that the foregoing conditions (1) to (3) are satisfied, whereby the virtual camera 609 moves in a direction to leave the controlled object 601 farther as the moving speed of the controlled object 601 is increased. Furthermore, the camera sight line direction 610 is pointed at a position further in front than the controlled object 601 as the motion speed thereof is increased.

Descriptions will be continued returning to FIG. 6.

An image generation section 806 generates a two dimensional image obtained by photographing the three dimensional field by the virtual camera in which a disposing position and sight line direction thereof are settled by the camera disposing section 805. In the three dimensional field, the topography and the controlled object are respectively disposed by the three dimensional map drawing section 803 and the object disposing section 804. To be concrete, the two dimensional image is generated by a processing (a rendering) performed in such a manner that by setting a disposing position of the virtual camera as a viewpoint, a direction of the virtual camera as a sight line direction, and rotating the virtual camera 609 around the camera sight line direction 610 as an axis depending on a bank of the controlled object, thus the controlled object and map constituent elements in the three dimensional field are projected on a virtual camera screen.

A display control section 807 transforms the two dimensional image generated by the image generation section 806 to a video signal, and outputs the video signal to a display device connected to the entertainment apparatus 1.

Note that the image generation section 806 and the display control section 807 are realized in such a manner that the CPU 51 uses, for example, the GTE 61 and the GPU 62 in FIG. 4.

Next, an operation of a software structure to realize a flight simulation constructed on the entertainment apparatus 1 will be described.

FIG. 14 is a flowchart for explaining an operation of the software structure to realize the flight simulation constructed on the entertainment apparatus 1.

The manipulation content reception section 801 first calculates the moving speed of the controlled object 601 (step S1001). To be concrete, by detecting a detection signal of a button having a role of a throttle of the controller 20, an ON/OFF time of the throttle after calculating the moving speed last time is measured. Then, a speed, which is obtained based on the measured time of the throttle ON and an acceleration previously determined, is added to the moving speed calculated last time. And/or, a speed, which is obtained based on the measured time of the throttle OFF and a deceleration previously determined, is subtracted from the moving speed calculated last time. Thus, the moving speed of the controlled object 601 is calculated.

Next, the manipulation content reception section 801 calculates the moving direction of the controlled object 601 (steps S1002 to S1004).

To be concrete, it is checked whether the coordinate value on the X-Y coordinate represented by the signal outputted from the controller 20 is within a predetermined range (step S1002). Note that this signals is outputted from the controller 20 by a manipulation performed for the manipulation sticks 31*a* and 32*a* of the controller 20 possessing a role as a control stick. For example, in the example shown in FIG. 3, it is checked whether the X coordinate value on the X-Y coordinate is equal to 240 or more and the Y coordinate value thereon is equal to 15 or less, and it is checked whether X coordinate value on the X-Y coordinate is equal to 15 or less and the Y coordinate value thereon is equal to 15 or less.

If the X coordinate value and Y coordinate value on the X-Y coordinate are within the predetermined ranges, the controlled object shall be allowed to perform a predetermined operation, and the moving direction of the controlled object 601 is determined to one required for the controlled object to perform this operation (step S1003). For example, in the example shown in FIG. 3, when the X coordinate value on the X-Y coordinate is equal to 240 or more and the Y coordinate value thereon is equal to 15 or less, it is judged that the controlled object is allowed to make a rapid circular flight to the upper right. Thus, it is assumed that from the moving direction of the controlled object calculated last time, the airplane represented by the controlled object 601 is banked to the right by 45 degrees and the nose of the airplane is risen by 45 degrees, and the moving direction of the controlled object 601 is calculated. When the X coordinate value on the X-Y coordinate is equal to 15 or less and the Y coordinate value thereon is equal to 15 or less, it is judged that the controlled object is allowed to make a rapid circular flight to the upper left. Thus, it is assumed that from the moving direction of the controlled object calculated last time, the airplane is banked to the left by 45 degrees and the nose of the airplane is risen by 45 degrees, and the moving direction of the controlled object 601 is determined.

On the other hand, if the X coordinate value and the Y coordinate value on the X-Y coordinate are not within the predetermined ranges, a bank of the airplane represented by the controlled object 601 and a rise and drop of the nose of the airplane are determined depending on the coordinate value on the X-Y coordinate shown by a signal outputted from the controller 20 by a manipulation performed for the manipulation sticks 31*a* and 32*a* thereof. Then, it is assumed that the airplane is made to bank and rise and drop its nose by the determined angles from the moving direction of the controlled object 601 calculated last time, and a moving direction of the controlled object 601 is determined (step S1004).

Next, the object position calculation section 802 calculates a position and posture of the controlled object 601 in the virtual three dimensional field (step S1005).

Specifically, the present position of the controlled object 601 is calculated based on the position and posture (moving direction) of the controlled object calculated last time and the newer moving speed of the controlled object 601 calculated by the manipulation content reception section 801. The present posture of the controlled object 601 is calculated in accordance with the newest moving direction of the controlled object 601 determined by the manipulation content reception section 801.

Next, the three dimensional map drawing section 803 checks whether a map must be updated (step S1006). For example, in the case where the map is updated every N times the calculation processing of the position of the controlled object 601 in the step S1005 is performed, a counter is provided, and it is checked whether a counter value reaches N. If the counter value reaches N, it is judged that the map must be updated, and the counter value is reset. The process advances to step S1007. On the other hand, if the counter value does not reach N, the counter value is incremented by one, and the process advances to step S1008.

In the step S1007, the three dimensional map drawing section 803 reads out map constituent elements to be disposed around the position of the controlled object from the map database DB503. The position of the controlled object was calculated by the object position calculation section 802 in the step S1005. Then, the three dimensional map drawing section 803 disposes the constituent elements in the three dimensional field. Thus, topography to be expanded around the position of the controlled object is expanded.

In the step S1008, in the three dimensional field in which the topography has been expanded by the three dimensional map drawing section 803 in the step S1007, the object disposing section 804 disposes the controlled object 601 at the position of the controlled object calculated by the object position calculation section 802 in the step S1005. Note that a three dimensional shape of this controlled object 601 is specified by the object data DA502. At this time, the controlled object is disposed so that a posture of the controlled object is identical to that of the controlled object calculated by the object position calculation section 802 in the step S1005.

Next, according to the way explained by the use of FIGS. 7 to 13, the camera disposing section 805 settles the disposing position and direction of the virtual camera 609 used for generating a two dimensional image from the three dimensional field in which the topography and the controlled object 601 are respectively disposed by the three dimensional map drawing section 803 and the object disposing section 804 in the steps S1007 and S1008 (step S1009).

In the manner described above, when the controlled object 601 and the topography surrounding the controlled object 601 are disposed in the three dimensional field, and when the disposing position and direction of the virtual camera 609, which photographs the controlled object 601 and the topography surrounding the controlled object 601 disposed in this three dimensional field, are settled, the image generation section 806 allows the virtual camera 609 to rotate around the camera sight line direction 610. Note that the virtual camera 609 rotates by setting the disposing position of the virtual camera 609 as a viewpoint and the direction of the camera 609 as a sight line direction and depending on a bank around the moving direction of the controlled object 601. Then, the image generation section 806 performs a rendering processing in which the controlled object 601 and the topography surrounding the controlled object 601, which are disposed in the three dimensional field, are projected on a virtual camera screen. Thus, the image generation section 806 generates the two dimensional image (step S1010).

Then, the display control section 807 transforms the two dimensional image generated by the image generation section 806 in the step S1010 to a video signal, and outputs the video signal to the display device connected to the entertainment apparatus 1 (step S1011).

By iterating the above described flow shown in FIG. 14, the entertainment apparatus 1 displays a moving picture on the display screen of the display device connected thereto. The moving picture is obtained by photographing the controlled object 601 with the virtual camera 609, the object 610 moving in the virtual three dimensional field in accordance with manipulation contents of the player received via the controller 20.

The embodiment of the present invention was described as above.

According to this embodiment, since the camera setup point 606' calculated last time is taken into consideration for the camera setup point 606 that is the disposing position of the virtual camera 609, the virtual camera 609 behaves so as to chase the controlled object 601 behind with little delay for the motion of the controlled object 601. When the controlled object 601 rotates around its moving direction as an axis, also the virtual camera 609 rotates around the camera sight line direction as an axis depending on the rotation of the controlled object 601.

Therefore, the player can easily grasp the behavior of the controlled object 601, which is controlled by the use of the controller 20, in the virtual three dimensional field through the display screen. Accordingly, the feeling of being at flight by the flight simulation game is enhanced, and the player can enjoy more the flight simulation game.

Furthermore, according to this embodiment, as the moving speed of the controlled object 601 is increased, the virtual camera 609 moves in a direction farther behind the controlled object 601.

Therefore, when the player increases the moving speed of the controlled object 601 by the use of the controller 20, a pictorial image surrounding the object taken by the virtual camera 609 broadens depending on an increase amount of the moving speed. In other words, the pictorial image surrounding the object displayed on the display screen of the display device broadens. Consequently, it is possible to prevent the control of the object from being extremely difficult when the moving speed of the controlled object 601 is increased.

The moving speed of the controlled object 601 is reflected on the moving picture displayed on the display screen of the display device as a relative speed of the object 601 for the topography, which is disposed around the object 610. Accordingly, though a pictorial image surrounding the object taken by the virtual camera 609 broadens depending on an increase amount of the moving speed of the controlled object 601, a feeling of speed acquired from the moving picture is not lost.

Furthermore, in this embodiment, the camera sight line direction 610 of the virtual camera 609 is pointed at a position further ahead in front of the controlled object 601 as the motion speed thereof is increased.

For this reason, when the player increases the moving speed of the controlled object 601 by the use of the controller 20, the pictorial image surrounding the object taken by the virtual camera 609 broadens farther in front than the object depending on the increase amount of the moving speed. Accordingly, when the moving speed of the controlled object 601 is increased, it is possible to further effectively prevent the control of the object from being extremely difficult for a player.

In addition, in this embodiment, the bank of the airplane, which is represented by the controlled object 609, is determined depending on the coordinate value on the X-Y coordinate, which is outputted from the controller 20 by the manipulation performed for the manipulation sticks 31a and 32a of the controller 20. Moreover, a rise and drop of the nose of the airplane is also determined depending on the coordinate value on the X-Y coordinate. When the X-Y coordinate values on the X-Y coordinate is within a predetermined range, it is judged that the controlled object 601 is allowed to perform a predetermined motion, that is, a motion such as a rapid circular flight considered to be difficult for a player to operate in the actual world. Then, the moving direction of the controlled object 601 is determined to be a direction required for performing this motion.

With such constitution, it is possible to make the control for the controlled object 601 simpler compared to the case where the manipulation sticks 31a and 32a of the controller 20 are allowed to possess quite the same function as that of the control stick. Accordingly, even an unskilled player can enjoy the flight simulation game satisfactorily.

Note that the present invention is not limited to the above described embodiment, the various changes, substitutions and alternations can be made therein without departing from spirit and scope of the invention.

In the foregoing embodiment, the camera setup point 606' calculated last time is taken into consideration for settling the camera setup point 606 that is a disposing position of the virtual camera 609. However, the present invention is not limited to this. The camera setup point 606 is satisfactorily settled as long as a camera setup point obtained at least one preceding calculation is taken into consideration.

For example, the camera setup point 606 may be settled at a position, which approaches to the camera chasing point 604 from a middle point between the camera setup point 606' and the camera chasing point 604 by the distance L/M. The distance L/M is obtained by dividing the distance L between the camera setup point 606' obtained in one preceding calculation and the camera chasing point 604 by a predetermined value M.

Alternatively, the camera setup point 606 may be settled at a position approaching to the camera chasing point 604 from a middle point by the distance L/M. The distance L/M is obtained by dividing the distance L between the camera chasing point 604 and the middle point by the predetermined value M. This middle point is located between the camera setup point 606' obtained in one preceding calculation and the camera setup point 606" obtained in two preceding calculation.

Although the above described embodiment was described using the example in which the flight simulation game is performed by the use of the entertainment apparatus 1, the present invention is not limited to this. For example, the present invention can be applied to cases in which performed are various TV games such as a drive simulation game capable of moving a controlled object in a virtual three dimensional field according to manipulation contents of a player received via the controller 20 by the use of the entertainment apparatus 1.

In the case where the drive simulation game is performed by the use of the entertainment apparatus 1, when a coordinate value on the X-Y coordinate is within a predetermined range, the coordinate value being represented by a signal outputted from the controller 20 by a manipulation performed for the manipulation sticks 31a and 32a, the manipulation content reception section 801 judges that the controlled object is allowed to perform an operation such as a rapid rotation that is considered to be difficult for a player to perform in the actual world. Then, the moving direction of the controlled object may be determined to be a direction required for performing this operation.

The method of settling the disposing position and direction of the virtual camera 609 in the present invention can be applied not only to the TV game but also to an apparatus which generates a moving picture by photographing a display object moving in a virtual three dimensional field with a virtual camera.

An appearance and hardware structure of the entertainment apparatus 1 are not limited to the ones shown in FIGS. 1, 2 and 4. The entertainment apparatus 1 having a constitution of a general computer may be adopted, which is composed of: a CPU; a memory; an external storage device such as a hard disc device; a reading device for reading out data from a recording medium such as a CD-ROM and a DVD-ROM having portability; an input device such as a keyboard and a mouse; a display device such as a display; a data communication device for communicating through a network of the Internet and the like; and an interface for data transmission/reception among the above described devices.

A program for constructing the software structure shown in FIG. 6 on the entertainment apparatus 1, as well as various data for specifying map constituent elements disposed in the three dimensional field and the three dimensional shape of the controlled object, are read out from the storage medium having the portability via the reading device, and may be stored in the memory and the external storage device. Alternatively, they may be downloaded from the network via the data communication device, and stored in the memory and the external storage device.

As described above, according to the present invention, in the entertainment apparatus, displaying the moving picture on the display screen of the display device, which is obtained by photographing the object moving in the virtual three dimensional field by the use of the virtual camera, the entertainment apparatus makes it possible for a player to grasp a behavior of the object in the three dimensional field based on the moving picture displayed on a display screen of a display device.

Particularly, in the entertainment apparatus in which a player can control the object moving in the virtual three dimensional field by the use of the controller for the flight simulation and the drive simulation, the player can more easily grasp the behavior of the object in the virtual three dimensional field through the display screen, the object being controlled by himself/herself. Thus, the feeling of being is increased and entertainingness is improved.

What is claimed is:

1. An entertainment apparatus which displays a moving picture on a display screen of a display device, the moving picture being obtained by photographing an object moving in a virtual three dimensional field, according to manipulation contents of a manipulator received via a controller, by the use of a virtual camera, comprising:

object position calculating means for sequentially calculating a position and a moving direction of said object in said three dimensional field; and camera setup means for determining a setup point of said virtual camera in said three dimensional field every time the position and moving direction of said object are calculated by said object position calculating means, while taking a setup point of the virtual camera obtained at least in the last calculation into consideration;

wherein,
said camera setup means includes means for settling a camera chasing point at a position higher by a predetermined value H than a position to the rear of said object from the position thereof by a distance K, the position being on a line which passes through a newly calculated position of said object by said object position calculating means and is parallel with a newly calculated moving direction of said object, and wherein said camera setup means settles a setup point of said virtual camera at a position approaching said camera chasing point from the setup point of said virtual camera obtained at least in the last calculation;

wherein said camera setup means settles the setup point of the virtual camera at a position approaching said camera chasing point from the setup point of said virtual camera obtained at least in the last calculation by a distance L/M, the distance L/M being obtained by dividing a distance L, which is between said camera chasing point and said virtual camera setup point, obtained at least in the last calculation, by a predetermined value M.

2. The entertainment apparatus according to claim 1, wherein
said camera setup means sets said distance K so as to be shorter as a moving speed of said object in said three dimensional field is increased.

3. An entertainment apparatus which displays a moving picture on a display screen of a display device, the moving picture being obtained by photographing an object moving in a virtual three dimensional field, according to manipulation contents of a manipulator received via a controller, by the use of a virtual camera, comprising:
object position calculating means for sequentially calculating a position and a moving direction of said object in said three dimensional field; and
camera setup means for determining setup point of said virtual camera in said three dimensional field every time the position and moving direction of said object are calculated by said object position calculating means, while taking a setup point of the virtual camera obtained at least in the last calculation into consideration;
wherein, said camera setup means includes means for settling a camera reference point at a position in front of the position of the object by a distance J, the position being on a line passing through a newly calculated position of said object by said object position calculating means, and the line being parallel with a newly calculated moving direction of said object, and wherein said camera setup means settles a sight line direction of the virtual camera so that said virtual camera is pointed at said camera reference point;
wherein, said camera setup means sets said distance J so as to be longer as a moving speed of said object in said three dimensional field is increased.

4. A storage medium storing a program which is read out and executed by a computer,
said program being read out and executed by said computer to realize means on said computer, said means displaying a moving picture on a display screen of a display device connected to the computer, obtained in such a manner that an object moving in a virtual three dimensional field according to manipulation contents of a player, which are received by said computer via a controller connected to said computer, is photographed by a virtual camera, and said means comprises:
object position calculating means for sequentially calculating a position and a moving direction of said object in said three dimensional field; and
camera setup means for determining a setup point of said virtual camera in said three dimensional field every time the position and the moving direction of said object are calculated by said object position calculating means, while taking the setup point of said virtual camera obtained at least in the last calculation into consideration;

wherein,
said camera setup means includes means for settling a camera chasing point at a position higher by a predetermined value H than a position to the rear of said object from the position thereof by a distance K, the position being on a line which passes through a newly calculated position of said object by said object position calculating means and is parallel with a newly calculated moving direction of said object, and wherein,
said camera setup means settles a setup point of the virtual camera at a position approaching said camera chasing point from the setup point of said virtual camera obtained at least in the last calculation;
wherein, said camera setup means settles the setup point of the virtual camera at a position approacing said camera chasing point from the setup point of said virtual camera obtained at least in the last calculation by a distance L/M, the distance L/M being obtained by dividing a distance L, which is between said camera chasing point and said virtual camera setup point obtained at least in the last calculation, by a predetermined value M.

5. The storage medium storing the program according to claim 4, wherein,
said camera setup means sets said distance K so as to be shorter as a moving speed of said object in said three dimensional field as increased.

6. A storage medium storing a program which is read out and executed by a computer,
said program being read out and executed by said computer to realize means on said computer, said means displaying a moving picture on a display screen of a display device connected to the computer, obtained in such a manner that an object moving in a virtual three dimensional field according to manipulation contents of a player, which are received by said computer via a controller connected to said computer, is photographed by a virtual camera, and said means comprises:
object position calculating means for sequentially calculating a position and a moving direction of said object in said three dimensional field; and
camera setup means for determining a setup point of said virtual camera in said three dimensional field every time the position and the moving direction of said object are calculated by said object position calculating means, while taking the setup point of said virtual camera obtained at least in the last calculation into consideration;

wherein, said camera setup means includes means for settling a camera reference point at a position in front of the position of the object by a distance J, the position being on a line passing through a newly calculated position of said object by said object position calculating means, and the line being parallel with a newly calculated moving direction of said object, and wherein, said camera setup means settles a sight line direction of the virtual camera so that said virtual camera is pointed at said camera reference point;

wherein, said camera setup means sets said distance J so as to be longer as a moving speed of said object in said three dimensional field is increased.

* * * * *